Feb. 9, 1926.

A. E. OSWALD 1,572,501

EXHIBITION DEVICE

Filed Jan. 25, 1921 9 Sheets-Sheet 2

Inventor:
Alfred E Oswald
by B L Stickney
Attorney

Feb. 9, 1926.
A. E. OSWALD
EXHIBITION DEVICE
Filed Jan. 25, 1921
1,572,501
9 Sheets-Sheet 3
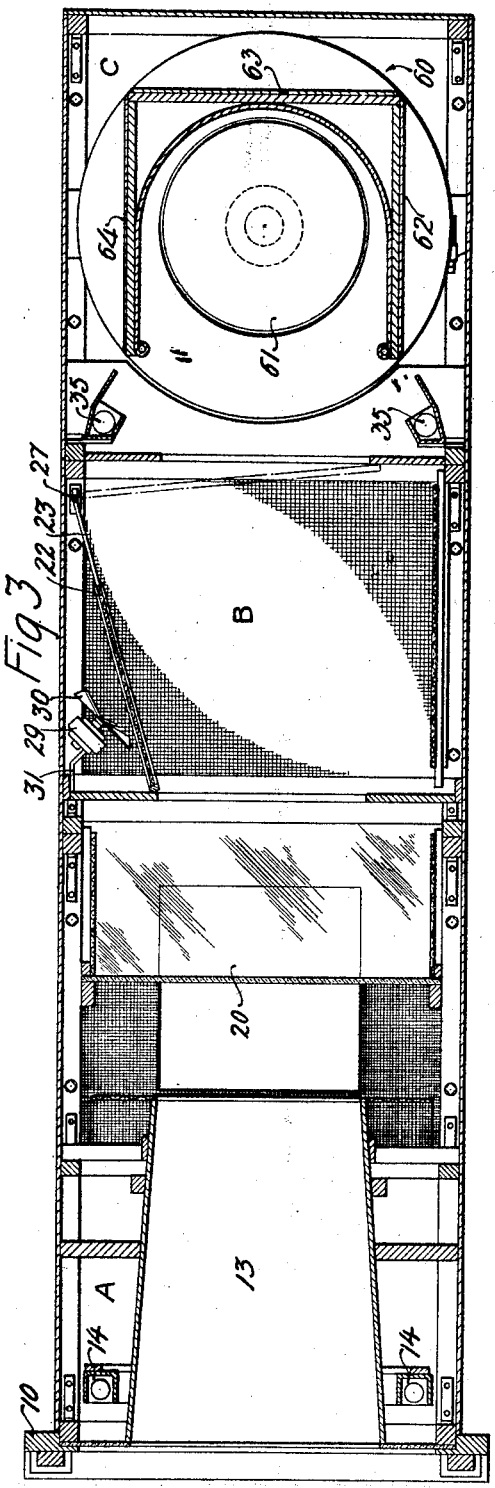
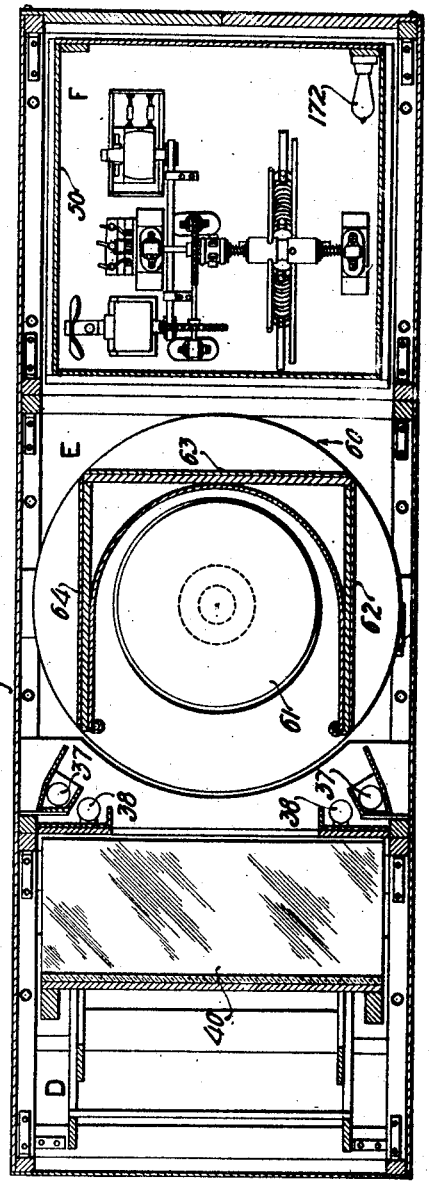
Inventor:
Alfred E. Oswald
by  D. C. Stickney
Attorney Feb. 9, 1926.
A. E. OSWALD
1,572,501
EXHIBITION DEVICE
Filed Jan. 25, 1921
9 Sheets-Sheet 4
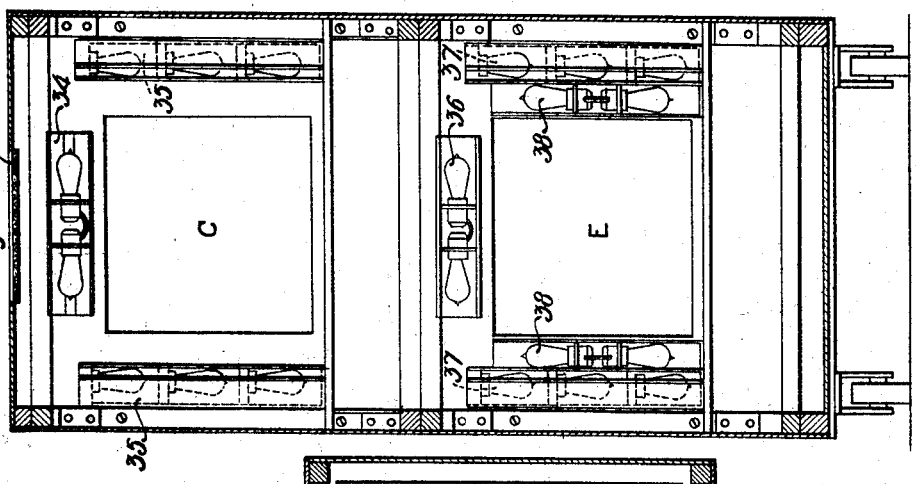
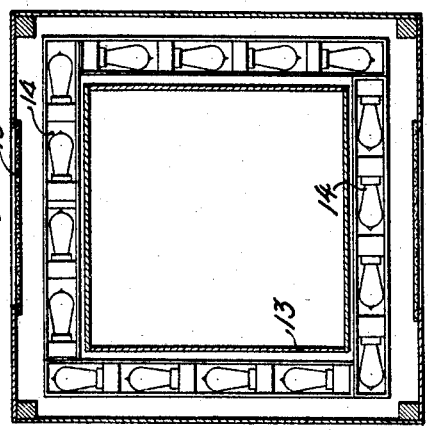
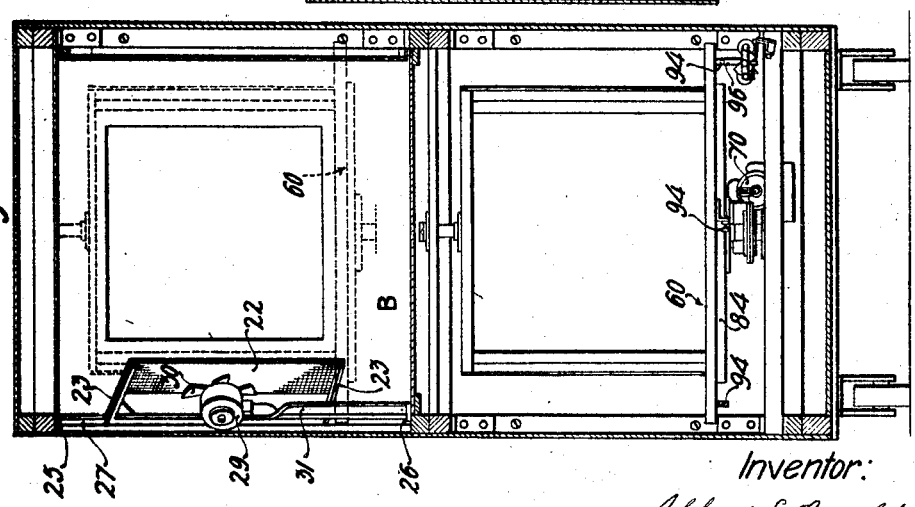
Inventor:
Alfred E Oswald
by D.C.Stickney.
Attorney Feb. 9, 1926.
A. E. OSWALD
1,572,501
EXHIBITION DEVICE
Filed Jan. 25, 1921
9 Sheets-Sheet 5
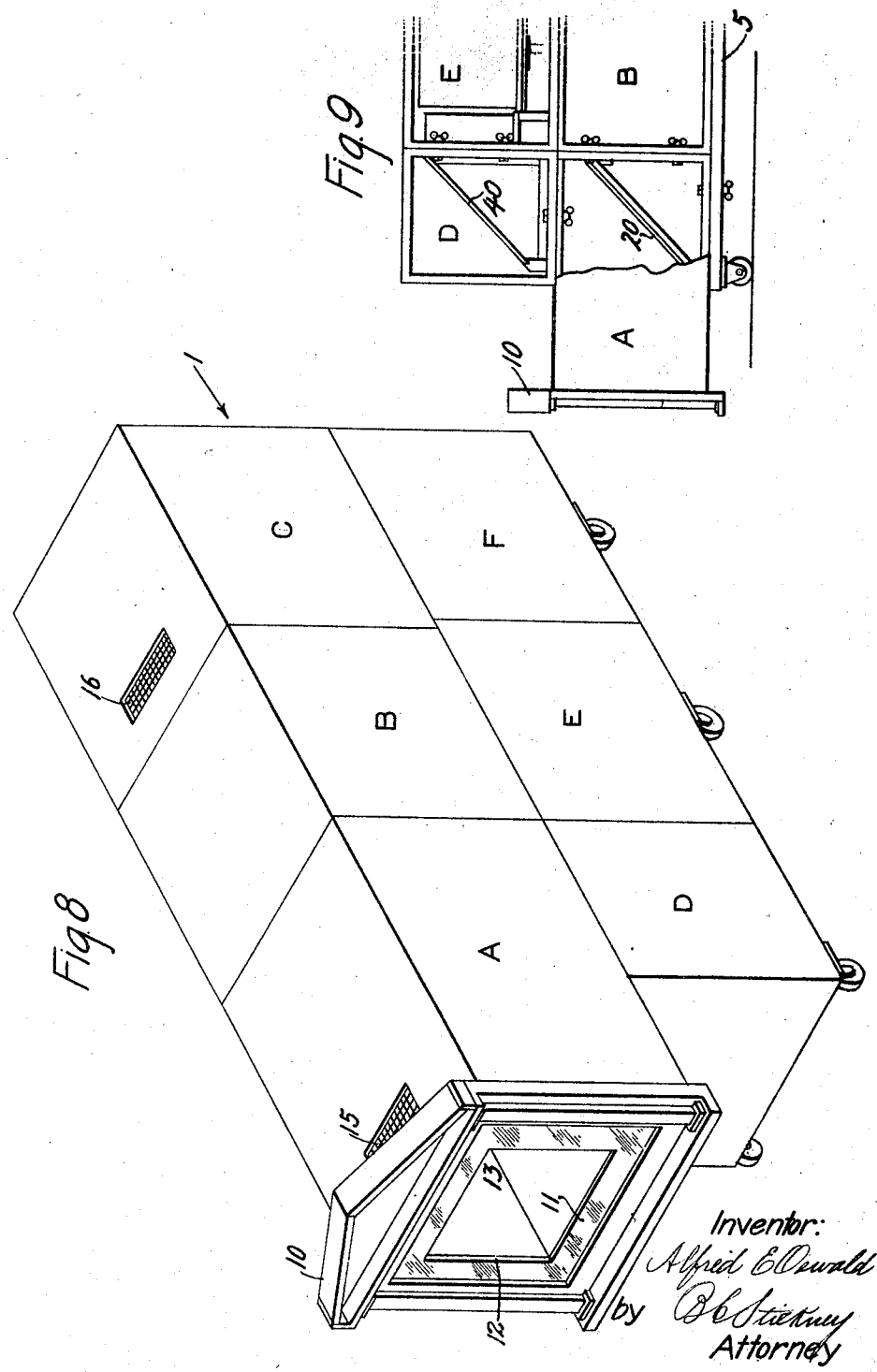

Feb. 9, 1926.
A. E. OSWALD
1,572,501
EXHIBITION DEVICE
Filed Jan. 25, 1921      9 Sheets-Sheet 6
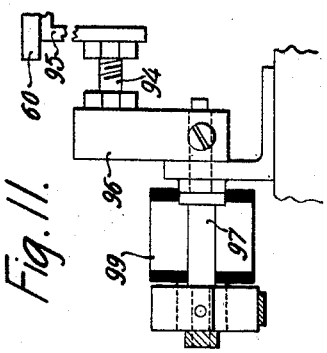
Fig. 11.
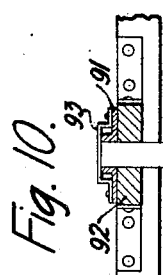
Fig. 10.
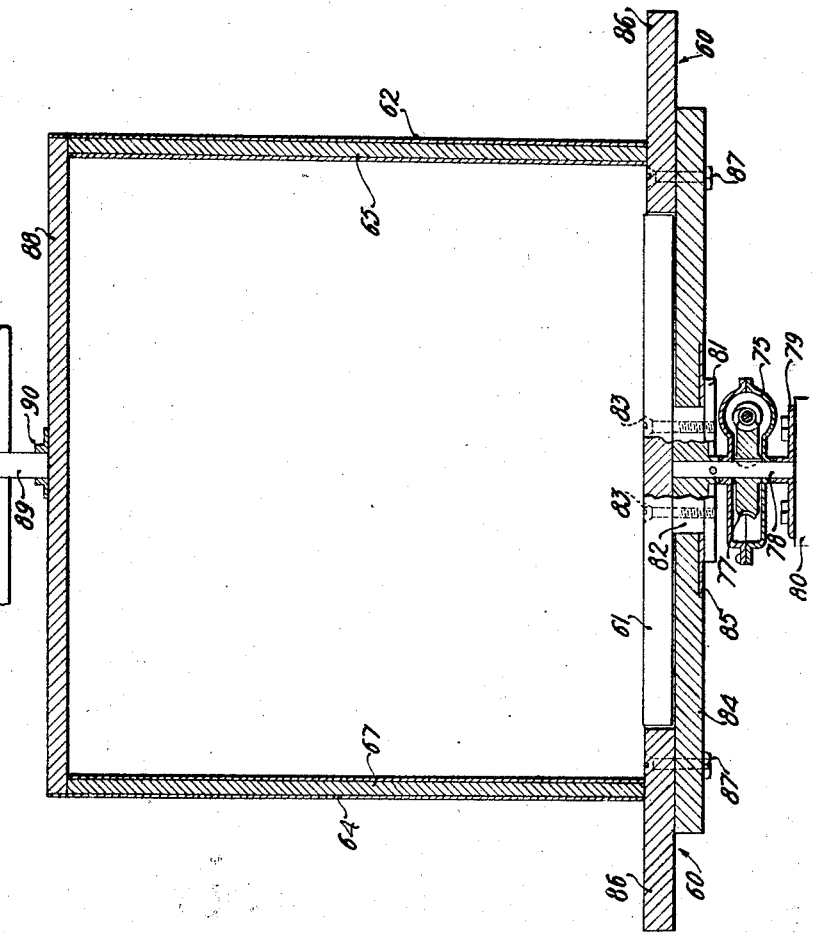
Inventor:
Alfred E Oswald
by Ob Stickney
Attorney

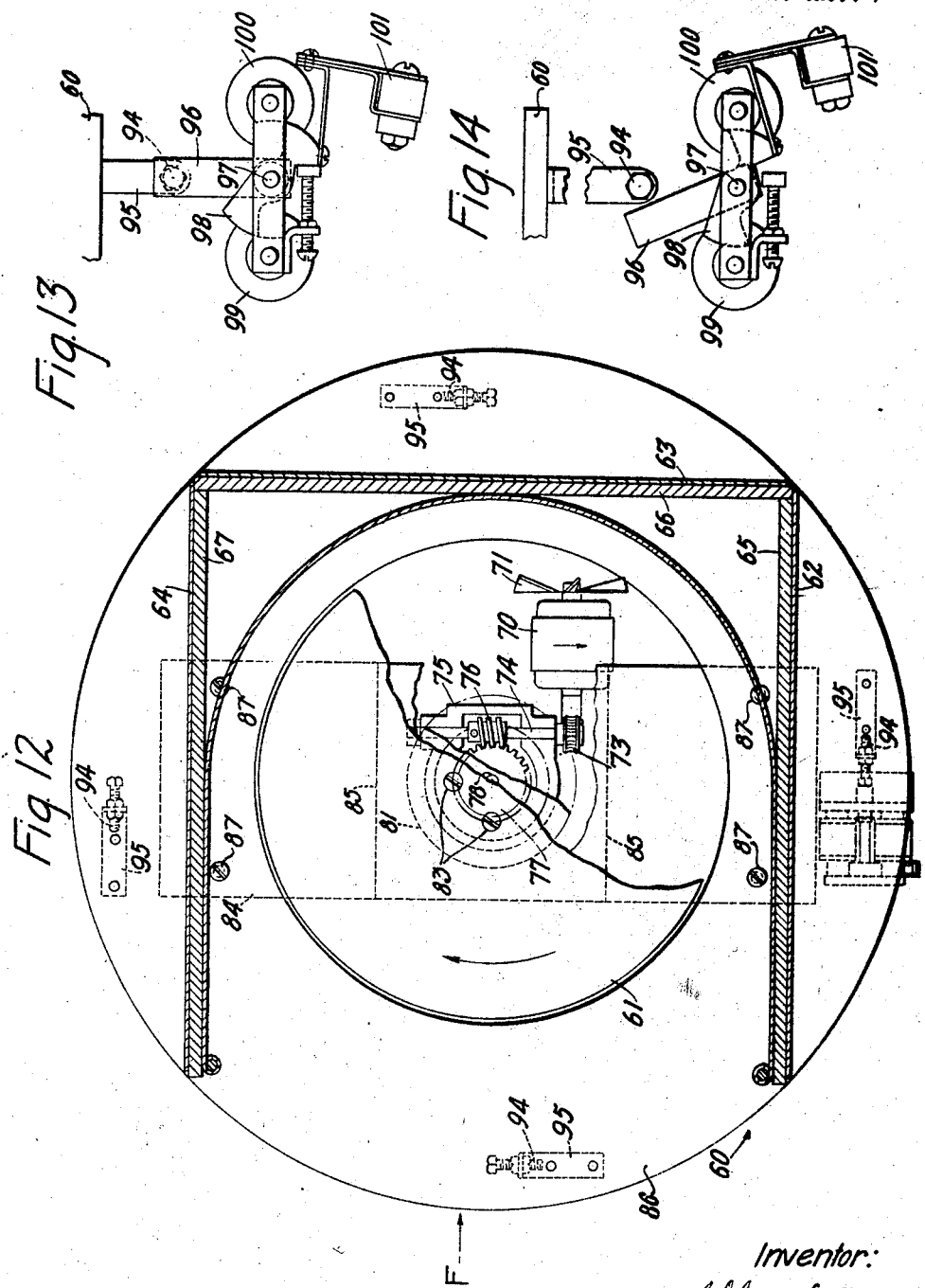

Feb. 9, 1926.
A. E. OSWALD
EXHIBITION DEVICE
Filed Jan. 25, 1921
1,572,501
9 Sheets-Sheet 8
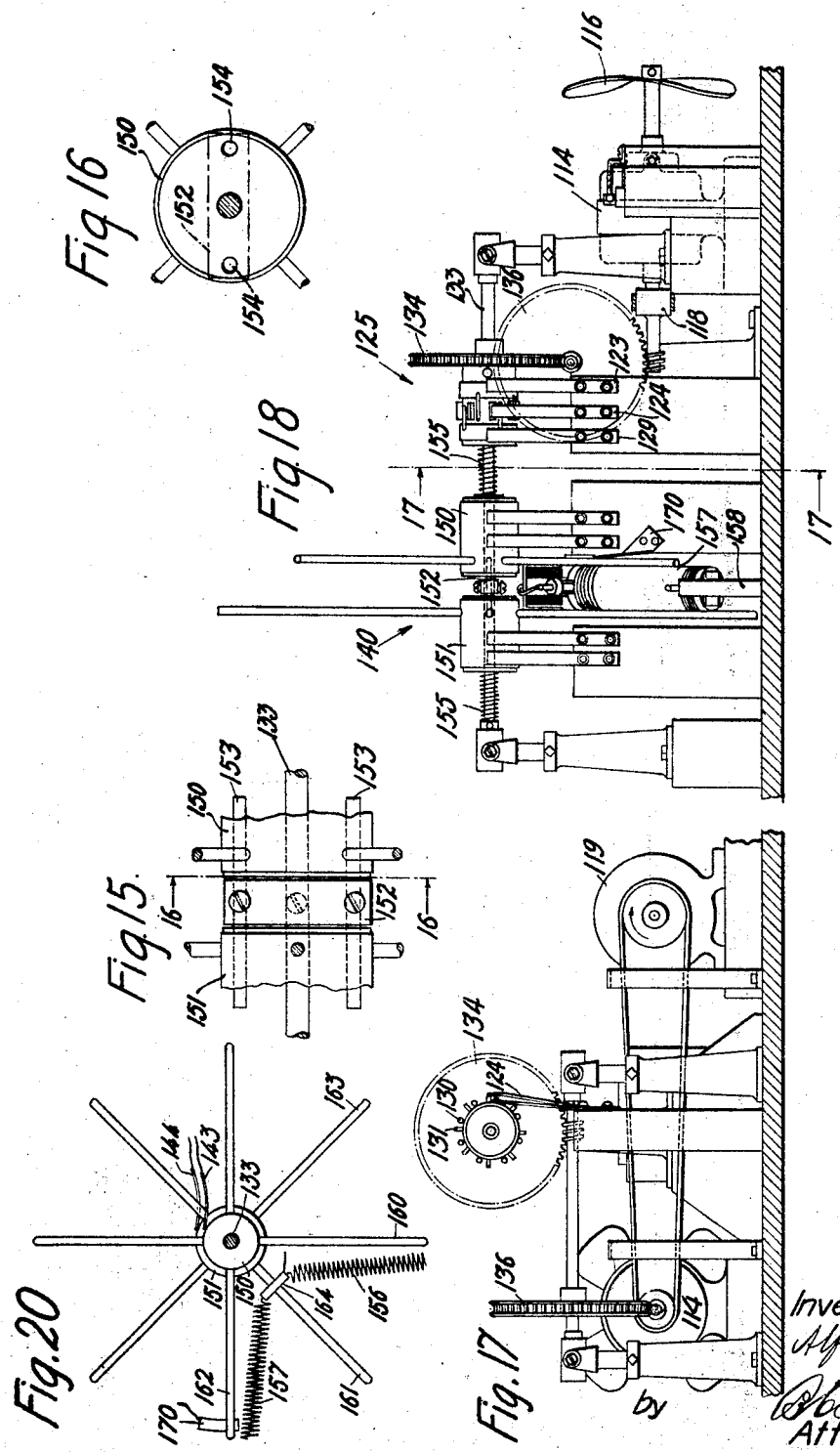
Inventor:
Alfred E. Oswald
by
Stickney
Attorney

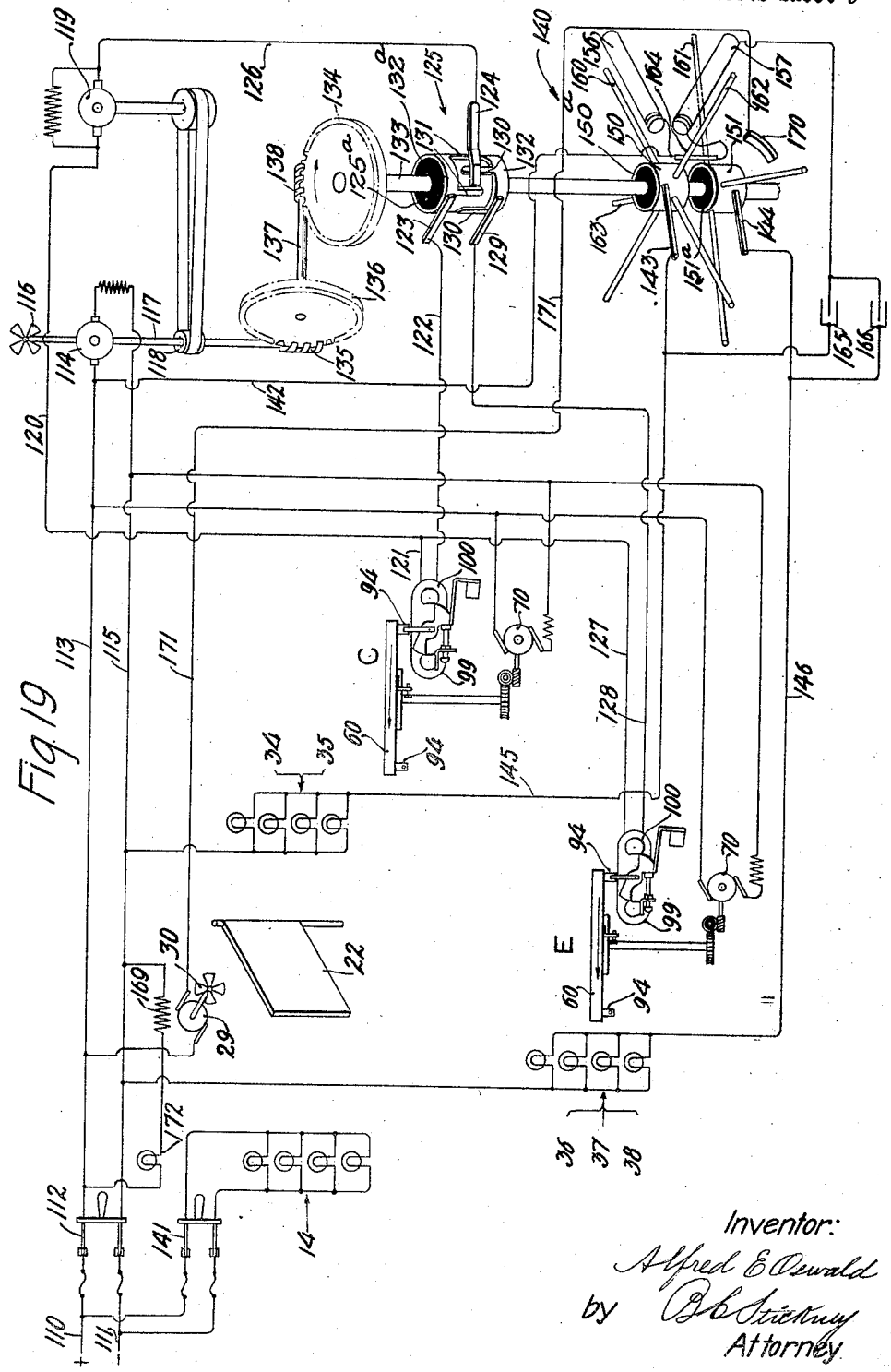

Patented Feb. 9, 1926.

1,572,501

UNITED STATES PATENT OFFICE.

ALFRED E. OSWALD, OF BOGOTA, NEW JERSEY, ASSIGNOR TO UNDERWOOD TYPEWRITER COMPANY, OF NEW YORK, N. Y., A CORPORATION OF DELAWARE.

EXHIBITION DEVICE.

Application filed January 25, 1921. Serial No. 439,775.

*To all whom it may concern:*

Be it known that I, ALFRED E. OSWALD, a citizen of the United States, residing in Bogota, in the county of Bergen and State of New Jersey, have invented certain new and useful Improvements in Exhibition Devices, of which the following is a specification.

This invention relates to exhibition devices, or display machines, of the general type shown in the patent to Wayrich, No. 1,154,950, dated September 28, 1915, and in my co-pending application, Serial No. 416,247, filed October 11, 1920 (now Patent No. 1,499,400, dated July 1, 1924), the present invention being an improvement over said application.

The general object to be accomplished is substantially the same as in the above-mentioned patent and application, namely, the presentation of a number of successive images which blend in passing from one to the other. The present invention is similar to the above-mentioned application in the provision of several sets of exhibits, one set viewed directly and the other reflected to the line of vision; of automatic means for dimming the lights of one exhibit while simultaneously brightening the other; of automatic means for changing the views of the darkened set; and of means for continuously rotating an object upon a platform while in view.

The present invention, however, distinguished from said application in the following respects:

1. A new housing and new method of arranging the views are provided so that the complete device takes up a minimum of lateral space. This condition is desirable where such space is valuable, as in exhibition halls, window displays, etc. This object is accomplished by mounting exhibits one above the other. The reflected object may be carried below the direct object which may be constructed so as to be on the line of sight of the spectator. Conditions may arise wherein the reflected object cannot be placed below, as where the device is mounted on a raised platform. Provision is therefore made for separating the various units so that the reflected object can be fixed above the units comprising the direct object. The entire structure is composed of separable units so that the device may be readily disassembled and conveniently shipped.

2. Novel and improved means for dimming the lights of one set of objects and simultaneously brightening the other set.

3. Novel and improved means for changing the views of the darkened set of objects.

4. Novel and improved means for rotating an object upon an exhibition platform.

5. Improved selecting mechanism for controlling the dimming and brightening of the lights for the various sets of objects, and for controlling also the rotation of the platforms for the change of views.

6. Improved driving means for said selecting mechanism.

7. Means operated by said driving means for generating current for mechanism which controls the releasing means for the rotating platforms.

8. A novel shutter, and operating mechanism therefor, obscuring the direct object when not exposed to view and forming a backing for a plain transparent glass which acts as a reflector.

Other features and advantages will hereinafter appear.

In the accompanying drawings,

Figure 3 is a section on the line 3—3 of Figure 2 and shows the units comprising the sight-opening or chute and upper reflector, the shutter, and the platform bearing the objects which are viewed directly.

Figure 4 is a section on the line 4—4 of Figure 2 and shows the units comprising the lower reflector, the platform bearing the objects whose images are reflected to the sight-opening, and the driving, controlling and selecting mechanisms.

Figure 5 is a section on the line 5—5 of Figure 2, and shows the upper unit comprising the shutter and driving mechanism therefor, and the lower unit comprising the lower platform.

Figure 6 is a section on the line 6—6 of Figure 2, and shows the distribution of the lights about the sight-opening.

Figure 7 is a section on the line 7—7 of Figure 2, and is designed to show the distribution of the lights about the upper and lower platforms, and the screening of said lights.

Figure 8 is a perspective of the complete device with the reflected object mounted below the main line of sight of the spectator.

Figure 9 is designed to show the units comprising the reflected object as carried above the main line of sight of the spectator, and shows in a general way the method of transposition.

Figure 10 is an enlarged detail of a platform, showing main and secondary platforms and the driving connections therefor.

Figure 11 is a side view, partly in section, of an arresting lug which normally prevents movement of the main platform.

Figure 12 is a plan view of a platform, showing the driving mechanism, and stops thereon adapted to co-operate with the arresting lugs.

Figure 13 is an end view of the arresting and releasing mechanism in position to prevent rotation of the main platform.

Figure 14 is a view similar to Figure 13, showing the mechanism in position to release the main platform and allow rotation thereof.

Figure 15 is a plan view of the hubs carrying the contact-rods of the selector mechanism, and showing the method of mounting so as to allow for lateral play.

Figure 16 is a section on the line 16—16 of Figure 5.

Figure 17 is a section on the line 17—17 of Figure 18.

Figure 18 shows the arrangement of the selector mechanism and driving mechanism.

Figure 19 is largely diagrammatic and shows the electrical connections governing the operation of the device.

Figure 20 is a diagrammatic view of the selector mechanism.

Figure 1:
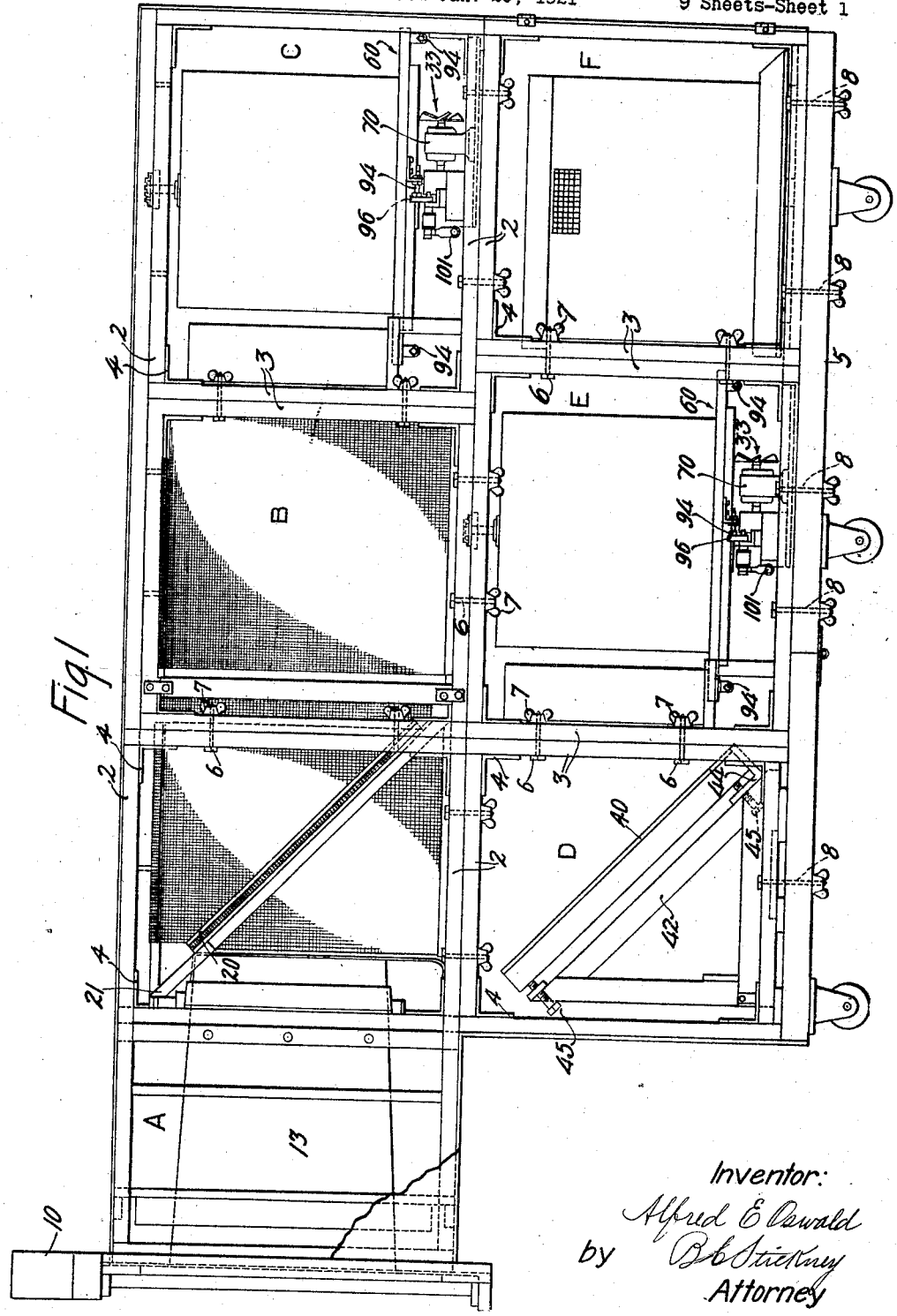
Figure 1 is a side view of the device, the outer side cover having been removed to expose the interior of the apparatus.

The invention is contained within a housing 1 (see Figure 8) which may be considered as comprising sections or units A, B, C, D, E, and F. As shown in Figure 1, the units each comprise a framework composed of horizontal and vertical rafters 2 and 3, respectively, and reinforced by angle-irons 4. The framework may be of ordinary construction and therefore need not be described in detail. The various units are joined, as shown in said Figure 1, by bolts 6 passing through adjacent frames, which are then drawn together by thumb-nuts 7 on the bolts. The lower units D, E and F are fastened to a lower platform 5 by bolts 8 similar to those used to fasten the frames together. The structure is then covered with suitable material, such as beaver-board, to make a closed housing.

It will be apparent that the housing may be readily disassembled into its various units, thus facilitating the shipment of the device. If the place of exhibition is not adapted for the placing of compartments D, E and F below the line of vision of the spectator, these units may be disconnected from platform 5 and from units A, B and C, and placed above the latter tier of units. Unit D is now rotated through 180 degrees with respect to units E and F to reflect the object in unit E downwardly, and unit A is rotated through 180 degrees with respect to units B and C to bring a reflector 20 in parallelism with a reflector 40 in unit D (see Figure 9). Units A, B. and C are then fastened to platform 5 and units D, E, F are fastened above A, B, C, the beaver-board covers having first been removed. The device then appears as in Figure 9. While unit A is reversed the ornamental frame 10 is also reversed with respect thereto so that it appears again in upright position.

Unit A comprises the ornamental frame 10 at its front end, in which is set a translucent glass plate 11 having a cut-out portion 12 (Figure 8). The cut-out portion forms the forward end of a darkened chute or sight-tube 13 leading to the interior of the housing. Back of the translucent portion 11 is set a framework of lights 14 (see Figure 6), which not merely provides ornamental illumination at the front of the device, but through the brilliancy of its light tends to obscure the changing views within the housing to render the illusion of merging views more complete. Screen members 15 and 16 in the roof of the housing provide for the free circulation of the air which is heated by the lamps within the housing. The sight-tube 13 ends adjacent the transparent glass plate 20, which constitutes a sight supported upon a framework 21. The spectator may look through the sight-tube 13 and glass-plate 20 to view directly an object in the rear. When provided with a sufficiently dark background, however, the glass plate 20 acts as a reflector to reflect an image transmitted to it from the lower tier (or upper tier, as the case may be) to the reflector.

Unit B comprises a shutter (see Figure 2) designed to provide the necessary dark backing for the plate 20 at the proper time. The shutter is a strip of cloth 22 mounted on a light frame 23, said frame being fixed to a shaft 27 pivoted at 25 and 26. The pivot 25 is to one side of pivot 26 in the plane of the paper, and backwardly therefrom in a vertical plane at right angles to the paper. The shutter thus has a tendency normally to fall backward due to gravity, out of the line of sight of the spectator, to expose the object in the rear. To render the shutter effective there is provided a motor 29 driving a fan 30, said motor being supported on a bracket 31, said fan being effective to operate the shutter when the object in unit C is darkened and the object in unit E illuminated, in a manner to be hereinafter described.

Unit C comprises a platform designated generally by the numeral 32, and driving mechanism therefor designated generally by the numeral 33. Top and side banks of lights 34 and 35, respectively, (see Figure 7), illuminate the object on the platform when it is exposed to view. The detailed structure of the platform and its driving mechanism, and means for brightening the lights 34 and 35 when the object is exposed to view and dimming them when the object is not exposed, will be described hereinafter. The front wall of unit C is provided with an opening through which the objects in the unit are viewed, and may be referred to as a display frame.

Unit D is of smaller size than unit A and contains the reflector 40 fixed to a wooden support 41 which rests on the inclined surface 42 of a support 43, being held by a bracket 44. Screws 45 enable the reflector 40 to be adjusted parallel to reflector 20.

Unit E is substantially similar to unit C both as to construction and apparatus contained therein. It comprises a platform, driving mechanism, and banks of lights 36, 37, 38. The additional set of lights for this unit is necessary because the light in E loses in intensity by reflection from the surface of plate 20, and the platform in E would appear dimmer than the platform in C if the extra illumination were not provided. The front wall of unit E may be considered as constituting a display frame for objects in that unit.

Unit F contains within the outer frame a housing 50, adapted to be illuminated by lamp 51 controlled by switch 52. Within the housing 50 is contained a selector mechanism, a driving mechanism therefor, and a generator, all of which will be hereinafter described in detail. Access to the interior of housing 50 is obtained through the removable back portion 53.

From the above, it is apparent that objects on the platform in unit C can be viewed through the sight-opening directly, while objects on the platform in unit E are reflected from surface 40 to surface 20 and thence to the spectator.

The structure of the platforms 32 and the driving mechanism therefor are best illustrated in Figures 10–14, inclusive. Referring particularly to Figures 10 and 12, it will be seen that the platform structure comprises an outer main platform 60 adapted to carry three vertical posters 62, 63 and 64 upon display walls 65, 66 and 67 forming three sides of a rectangular box. The fourth side is missing and thus enables the secondary platform 61 to be viewed. The secondary platform is adapted to rotate within a cut-out portion in the main platform 60, and concentrically therewith. In the particular type of exhibit used in the device illustrated, provision is made for four views on each platform structure. Three of the views are posters which remain stationary while being viewed; the fourth is mounted upon the secondary platform and is adapted to be continuously rotated, although it is exposed to view only at every fourth quarter-rotation of the main platform. The entire platform structure is adapted to be turned through a quarter-turn at intervals so as to bring the next poster or the object on the secondary platform into view. The means for continuously rotating the secondary platform, and the means for rotating the entire platform structure at intervals, are now to be described.

The axis about which the secondary platform rotates is the axis about which the entire platform structure rotates. A motor 70, provided with the usual controlling member or fan 71, has at the end of its driving-shaft a worm 72 which meshes with a gear-wheel 73 on the end of a shaft 74. Said shaft 74 is journaled in a casing 75 and is provided intermediate its ends with a worm 76 meshing with a gear-wheel 77 fast to a shaft 78. The shaft 78 has a lower bearing 79 fixed to a strap or bar 80 fixed to the frame of the unit. At the upper end of shaft 78 is carried rigidly therewith the secondary platform 61 which is attached to block 82 fixed to the shaft and bearing-plate 81 by screws 83. A strap 84 forming the bottom of the platform 60, and cut out to surround block 82, has a plate 85 adapted to slide upon plate 81. A circular member 86 forming the upper member of the platform 60, and cut out to surround the secondary platform 61, is fixed to member 84 by screws 87 to move rigidly therewith. Member 86 carries the vertical walls supporting the posters. The upper edges of these walls are covered by a plate 88 to which is rigidly attached a bearing block 90. A shaft 89 rotates in bearing block 90 and in bearing block 91 fixed to a strap 92 rigid on the framework of the unit. A cover-plate 93 limits the vertical movement of the shaft.

The weight of the platform 60 provides sufficient friction between bearing plates 81 and 85 so that the main and secondary platforms rotate together. The position of the vertical axis of shaft 78 does not shift and hence the vertical axis of the secondary platform does not shift its position. However, if the main platform rotates a quarter turn at intervals, the three posters will be in the line of sight indicated by arrow F (see Figure 12) in three of the four positions. In the fourth position, that shown in Figure 12, the secondary platform will be exposed to view.

It has been stated above that sufficient friction is provided so that the main and secondary platforms rotate together. Since it is essential that the main platform rotate only when a change of views is desired, means must be provided for overcoming the frictional engagement except when it is desired to change the views. The means comprises stops 94 on brackets 95 fixed to the lower side of the main platform 60, and adapted to engage rock-arms 96 which lie normally in the path of movement of the main platform and stops, and which are adapted to overcome the frictional engagement between the platforms, but which can be rotated out of such path in order to allow rotation of the main platform with the secondary platform when a change of views is desired. Each rock-arm 96 is fixed to a shaft 97 carrying an armature 98 at its other end, said armature co-operating with the cores of two electro-magnets 99 and 100 in an electro-magnetic circuit. When it is desired to change the views, the magnets are energized, the armature 98 is drawn to the Figure 14 position, rotating arm 96 out of the path of a stop 94, allowing the main platform to rotate with the secondary platform. The means for energizing the magnets are rendered ineffective soon after the stop has passed, the arm 96 returning to position in time to intercept the next stop. To aid the return of the arm 96 when the energizing means have been rendered ineffective a counterweight 101 is provided. The means for energizing the electro-magnets, the means for breaking the circuit automatically at the proper time, and the means for alternately rotating the platform in one unit while the other platform is being exhibited, will be hereinafter described.

Referring now to Figure 19, current (either A. C. or D. C.) from any ordinary supply circuit enters and leaves at the main terminals 110, 111, controlled by switch 112. The current travels along conduit 113, energizes the universal series motor 114 (capable of being used with A. C. or D. C. current) and returns along conduit 115. Motor 114 has a regulating member and cooling fan 116 at one end of its driving shaft 117. A hub 118 fixed to the shaft serves as a support for a belt drive for a shunt-wound generator 119 which supplies current to the electro-magnets controlling the release of the platforms. The circuit through the magnets in unit C comprises conductors 120, 121, the coils of the electro-magnets of the platform in unit C, conductor 122, brushes 123 and 124, the magnet-rotating controlling members 125, and conductor, 126, which is connected with the generator 119. The circuit through the magnets in unit E comprises conductors 120, 127, the coils of the magnets in E, conduit 128, brushes 129 and 124, the magnet-controlling member 125, and conduit 126, which is connected with the generator 119. It will thus be seen that the current through the magnets is controlled by the rotating contact-rings 132 and 132ª, of which the prongs 130 and 131 alternate, the contact-ring 132 being part of the circuit through the magnets in E, and the contact-ring 132ª of the circuit through the magnets in C; and that brush 124 closes these circuits alternately upon rotation of the shaft 133, thus alternately energizing the magnets on C and E, and allowing the respective platforms to rotate alternately to new positions. The contact-rings 132 and 132ª are mounted on a non-conducting member 125ª, which is secured on a shaft 133 having a gear-wheel 134 at one end driven by shaft 117 through worm 135, gear-wheel 136, shafts 137 and worm 138 meshing with gear-wheel 134. The shaft 133 also drives the selector mechanism controlling the lights (see Figures 17, 18 and 19) and designated generally as 140.

The illuminating system comprises the bank of lights 14 which is supplied from the main terminals 110 and 111 and controlled by switch 141. The current for the banks of lights 34, 35 in unit C, and 36, 37, 38, in unit E is led in by conductor 142, and passes through the selector mechanism to brush 143 or 144, the former leading through conductor 145 to the lights in C, the latter leading through conductor 146 to the lights in E, and then to conductor 115.

Figure 2:
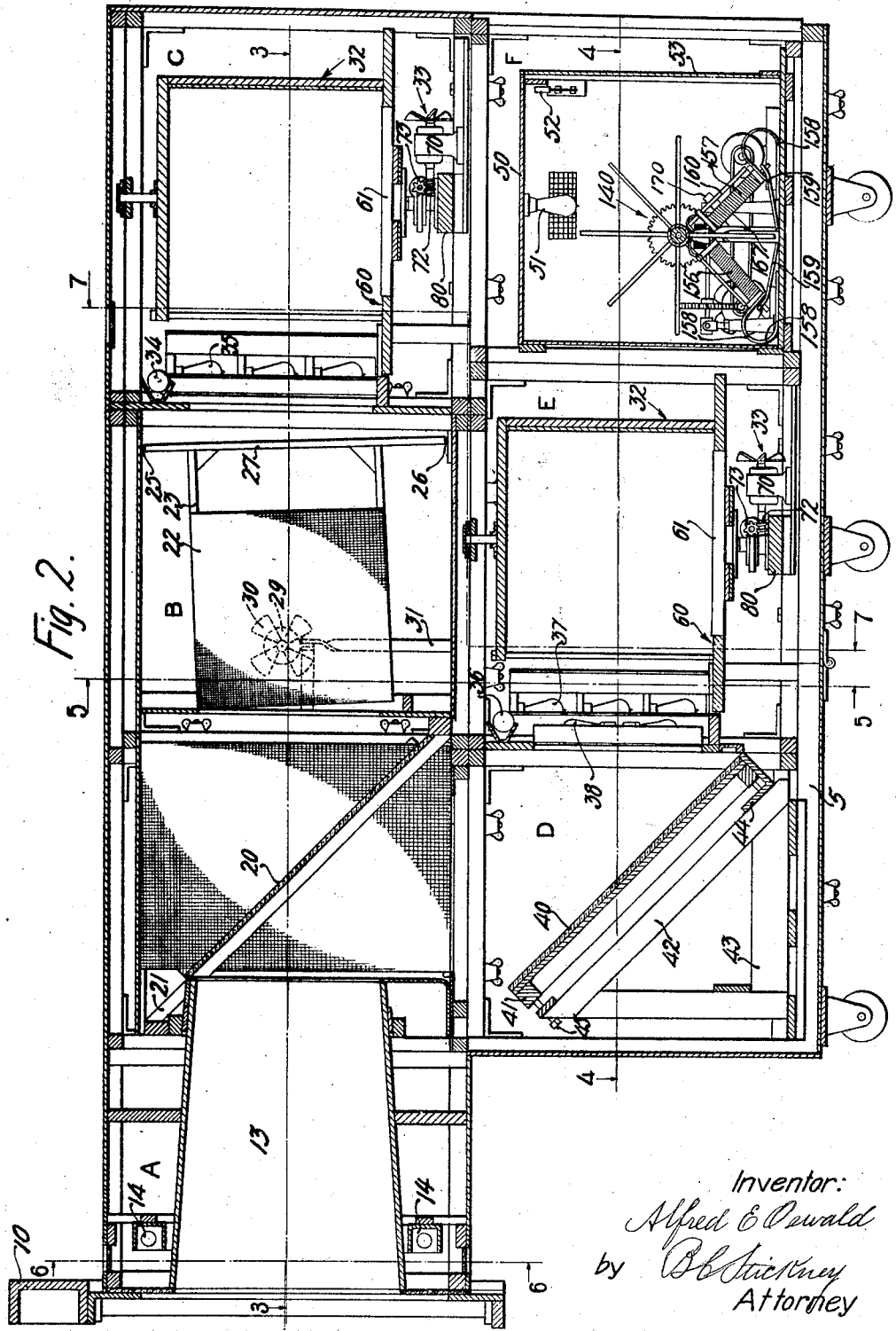
Figure 2 is a longitudinal section of the device in Figure 1 adapted to expose more details of the operating mechanism.

The selector mechanism (Figures 17 and 18) which brightens the lights of unit C while dimming those of unit E, and then reverses the procedure, comprises contact-rings 150, 151, mounted by means of non-conducting members 150ª and 151ª on shaft 133, so as to permit freedom of movement along the latter. They are caused to rotate with the shaft by the arrangement (shown in Figure 15) comprising a central bar 152 fixed to the shaft 133 and provided with pins 153, to either side thereof, fitting into openings 154 (shown in Figure 16) in the members 150ª and 151ª. Springs 155 normally press the members 150ª and 151ª against the bar 152. As shown in Figures 2 and 18 (and diagrammatically in Figure 19), coils 156 and 157 are disposed in a plane centrally between the members 150ª and 151ª. The coils are held in position at their lower ends by members 158 and 159 fixed to the base of housing 50, and at their upper ends by a loop on the end of a strap 167. Each of the contact-rings 150 and 151 is provided with a set of contact rods, one set to either side of the coils, the rods of one set alternating in arrangement with the rods of the other set. There are as many rods on each of the contact-rings 150 and 151 as there are views on the platform, in this case, four. The rods are pressed by the springs into close engagement with the coils.

The operation of the selector mechanism for controlling the lights is as follows: Referring to the diagrammatic representation of Figures 19 and 20, it will be seen that the current for the bank of lights 34, 35 passses through the coils to the upper contact rods 160 and to brush 143. The current for the lights 36, 37, 38 passes through the coils to the contact rods on the contact-ring 151 and to brush 144. Upper contact rod 160 is shown about to touch coil 156 at its outermost point (see Figure 20). Rod 162 has just passed off coil 157. The circuit through lights 34, 35, is therefore broken, and these lights are completely extinguished. Upon further rotation of the shaft 133 rod 160 will come in contact with coil 156. The current for lights 34, 35 must now pass through the full resistance coil before reaching the rod 160, and the lights will remain practically extinguished. Rod 161 at the same time is riding on bar 164, hence there is practically no resistance in the circuit through lights 36, 37, 38 and the latter are fully illuminated. As the shaft 133 rotates, however, rod 160 rides down the resistance coil 156, thus lessening the resistance in the circuit of lights 34, 35, and increasing their illumination until the rod touches the lowest point of the coil and rests upon bar 164, giving a full illumination. At the same time rod 161 is riding up the coil 157, thus dimming the lights 36, 37, 38 until the rod drops off the outer end of the coil and completely extinguishes these lights. Upon further rotation of shaft 133, rod 160 rides up coil 157 to dim lights 34, 35, while rod 163 rides down coil 156 to brighten lights 36, 37, 38.

The shutter-operating mechanism is operated when the lights 34, 35 are dimmed, and remains effective until the platform has rotated to a new position. Let us assume that rod 160 is traveling up coil 157 to dim the lights 34, 35. As it approaches the end it comes in contact with a brush 170 and closes the circuit through conductor 171 and starts the motor 29. Conductor 171, leading through brush 170, rod 160, to the point where said rod touches coil 157, and conductor 142, leading through coil 157 to the same point, are both connected to the feed wire 113. Both conductors may be considered as wired in parallel between wire 113 and the point where rod 160 touches coil 157. Whatever drop in voltage takes place in one branch takes place also in the other.

As rod 160 nears the end of coil 157, the branch containing this coil has a greater drop in voltage. The same voltage exists in the other branch containing motor 29. Said motor is therefore started but at a speed insufficient to drive the shutter to effective position. When, however, rod 160 drops off coil 157 the entire voltage, usually 110, is at once effective to drive motor 29 which attains full speed and drives the shutter 22 to effective position. Rod 160 remains in contact with brush 170 until the platform in C has rotated to a new position. The platform is then ready to be illuminated, and the rod 160 drops off brush 170, the motor stops, and the shutter falls back. The field coil 169 aids in damping the rotation of the motor to effect a rapid cessation of motion. A lamp 172 is included in said field coil circuit as a safety resistance, since only a fraction of the entire current fed in at the main terminals is utilized to energize the field coil.

When the rods leave the resistance coils the breaking of the circuit tends to produce sparks with consequent "freezing" of contacts. To obviate this condition condensers 165 and 166 are provided to take up the induced charge.

The operation of the complete device is as follows: The lights 14 around the front sight-tube are thrown on by closing switch 141. The switch 112 is closed, thus starting motor 114, shaft 133, and the platform release mechanism 125 and selector mechanism 140. Let us assume that the platform in unit C is at its fullest illumination and just beginning to dim. The platform in E is practically dark, but is beginning to brighten. As shaft 133 rotates, the platform in C grows dimmer, and the platform in E brighter. Just before lights 34, 35 in C go out, motor 29 starts, and when the lights are out, the fan blows the shutter to shut out reflected light from the rear. The platform in E is at its fullest illumination. A prong 131 engages brush 124, and the arm 96 is rotated to release the main platform in C which rotates with the secondary platform to the next position, the arm 96 having been restored to position to engage the next stop 94. At this point the motor 29 ceases to operate and the shutter falls back. The lights in C now begin to brighten, while the lights in E are dimmed. When E is darkened completely, the main platform in E is released to rotate to the next position. The lights in E then gradually brighten while those in C are gradually dimmed, and the process is repeated as above. The shutter operates only while the platform in C rotates to a new position, because reflected light may enable the spectator to see the rotating platform. There is not likely to be sufficient reflected light to make the platform in E visible while rotating to a new position and no shutter mechanism is therefore necessary.

Variations may be resorted to within the scope of the invention, and portions of the improvements may be used without others.

Having thus described my invention, I claim:

1. In an exhibition-device comprising a front sight-tube, the combination of a rotatable upper object-bearing platform and a rotatable lower object-bearing platform alternately displayable, said upper platform being positioned to be viewed directly through said sight-tube, and means for reflecting said lower platform first upwardly and then forwardly to said sight-tube, the lower platform being mounted for rotation about a vertical axis.

2. In an exhibition device comprising a front sight-tube, the combination of an upper object-bearing platform and a lower object-bearing platform to be alternately displayed, one of said platforms being positioned to be viewed directly through said sight-tube, and means for reflecting the other of said platforms to said sight-tube, the platform to be reflected being mounted first vertically and then forwardly for rotation about a vertical axis.

3. In an exhibition device, the combination of an upper tier of units comprising a front sight-tube in one of said units and an object-bearing platform positioned to be viewed directly through said sight-tube in another of said units, a lower tier of units comprising a second object-bearing platform, and means in said upper and lower tiers for reflecting said lower platform to said sight-tube, said upper and lower tiers being viewable simultaneously and being separable from each other.

4. In an exhibition device, the combination of an upper tier of units and a lower tier of units, one of said tiers comprising a front sight-tube in one of its units and an object-bearing platform positioned to be viewed directly through said sight-tube and contained in another of its units, the other of said tiers comprising a second object-bearing platform, and means in said upper and lower tiers for reflecting said second platform to said sight-tube, said upper and lower tiers being viewable simultaneously and being separable from each other.

5. In an exhibition device, the combination of an upper tier of units comprising a front sight-tube in one of said units and an object-bearing platform positioned to be viewed directly through said sight-tube and contained in another of said units, a lower tier of units comprising a second object-bearing platform, and means in said upper and lower tiers for reflecting said lower platform to said sight-tube, said upper and lower tiers being viewable simultaneously and being separable from each other, said units composing said tiers being separable from each other.

6. In an exhibition device, the combination of an upper tier of units and a lower tier of units, one of said tiers comprising a front sight-tube in one of its units and an object-bearing platform positioned to be viewed directly through said sight-tube and contained in another of its units, the other of said tiers comprising a second object-bearing platform, and means in said upper and lower tiers for reflecting said second platform to said sight-tube, said upper and lower tiers being viewable simultaneously and being separable from each other, and said units composing said tiers being separable from each other.

7. In an exhibition device, the combination of an upper tier of units comprising a front sight-tube in one of said units and an object-bearing platform positioned to be viewed directly through said sight-tube and contained in another of said units, a lower tier of units comprising a second object-bearing platform, and means in said upper and lower tiers for reflecting said lower platform to said sight-tube, said upper and lower tiers being viewable simultaneously and being separable from each other and their units being so constructed that the units may be re-assembled with the units, formerly in the lower tier, in the upper tier, and vice versa.

8. In an exhibition device, the combination of an upper tier of units comprising a front sight-tube in one of said units and an object-bearing platform positioned to be viewed directly through said sight-tube and contained in another of said units, a lower tier of units comprising a second object-bearing platform, and means in said upper and lower tiers for reflecting said lower platform to said sight-tube, the units of said upper and lower tiers being separable from each other and so constructed that the units may be re-assembled with each unit, formerly in one tier, shifted to the other and with each of the units in said upper and lower tiers, containing the reflecting means, inverted to reflect downwardly the platform previously reflected upwardly.

9. In an exhibition device, the combination of an upper tier of units and a lower tier of units, one of said tiers comprising a front sight-tube in one of its units and an object-bearing platform positioned to be viewed directly through said sight-tube and contained in another of its units, the other of said tiers comprising a second object-bearing platform, means in said upper and lower tiers for reflecting said second platform to said sight-tube, said upper and lower tiers being separable from each other, said units composing said tiers being separable from each other, and each of said units comprising an open framework, and fastening means passing through the framework of adjacent units to clamp said units and tiers together.

10. In an exhibition device, the combination of a row of units, a sight-tube in one of the end units of said row, an exhibit-support positioned to be viewed directly through said sight-tube and contained in another unit of said row, a second row of units lying along the first row of units, an exhibit-support in one of the units of the second-mentioned row, and means partly in one row and partly in the other row for reflecting an exhibit on the last-mentioned exhibit-support to said sight-tube, said rows of units and the units in said rows being separable.

11. In an exhibition device, the combination of a row of units, a sight-tube in one of the end units of said row, an exhibit-support positioned to be viewed directly through said sight-tube and contained in another unit of said row, a second row of units lying along the first row of units, an exhibit-support in one of the units of the second-mentioned row, and means for reflecting an exhibit on the last-mentioned exhibit-support to said sight-tube, said units being separable and being so constructed that they may be assembled with the units of the second row on either side of the units of the first row without affecting the view of the exhibits through said sight-tube.

12. In an exhibition device, in combination, a plurality of rectangular units comprising a unit having an exhibit-support therein, a second unit at the front of the first unit, a third unit to be positioned at the front of the second unit and having a sight at its front end to permit a direct view of an exhibit on the exhibit-support in the first unit, and an inclined transparent reflector plate to permit the exhibit in the first unit to be viewed directly through the sight, and to reflect to the sight an exhibit at one side of the path of view from said sight, a fourth unit containing said last-mentioned exhibit, and a fifth unit in front of the fourth unit and having a reflector to reflect the object in the fourth unit to the reflector plate, said third unit being so constructed and the reflector plate so supported therein that, when the third unit is positioned in front of the second, either the exhibit in the first unit may be viewed directly from the sight or an exhibit in the fourth unit may be reflected by means of said reflector plate and said reflector to the sight, the second and fourth units being so constructed that the latter may be placed on different lateral faces of the second unit around the line of sight in accordance with the positioning of the third unit and inclined reflector plate, and the third and fifth units being so constructed that the fifth may be attached to different lateral faces of the third unit around the line of sight.

13. In an exhibition device, in combination, a housing, a sight to enable exhibits in said housing to be viewed from the outside thereof, a display frame positioned to permit exhibits at the rear thereof to be viewed directly from the sight, a second display frame out of the line of vision through said sight, means to reflect an exhibit shown in the second display frame to the sight, and means for changing the exhibits at one of the display frames while an exhibit at the other display frame is being viewed, said changing means comprising a main exhibit-carrier having a plurality of plane exhibit-supports to be presented at the corresponding display frame, a secondary carrier coaxial with the first and driven continuously, there being a frictional engagement between said main exhibit-carrier and the secondary carrier, an exhibit on said secondary carrier being screened by the plane exhibit-supports except in one position of the main exhibit-carrier, and means to cause a step movement of the main exhibit-carrier to be effected while an exhibit is being viewed through the other display frame.

14. In an exhibition device, in combination, a housing, two display frames within said housing, a sight to permit said display frames to be viewed from outside the housing, controlling means whereby exhibits to be viewed through said display frames may be illuminated alternately and viewed at said sight, said controlling means comprising means to increase the illumination at one of said display frames while diminishing the illumination at the other to cause successive views to dissolve from one into the other, and means to change exhibits at one of said display frames comprising a constantly-rotating exhibit-support positioned to permit an exhibit thereon to be viewed through the corresponding display frame, a main exhibit-carrier coaxial with and urged to rotate with said constantly-rotating exhibit-support and having at regular intervals exhibit-supports which will screen the exhibit on the constantly-rotating support except when the main exhibit-carrier is in the proper position to view the constantly-rotating support, and escapement means to permit step-by-step movement of said main exhibit-carrier to successive display positions.

15. In an exhibition device, the combination of a row of units, a sight in the outer end of one of the end units of said row, an exhibit-support positioned to be viewed directly through said sight and contained in another unit of said row, a second row of units lying along the first-mentioned row, an exhibit-support in one of the units of the second-mentioned row, means for reflecting an exhibit on the second-mentioned exhibit-support to said sight, all of said units being separable, illuminating means in the unit of the first-mentioned row which contains the first-mentioned exhibit-support, illuminating means in the unit of the second-mentioned row which contains the second-mentioned exhibit-support, and means for increasing the illumination of one of said illuminating means and simultaneously diminishing the illumination of the other illuminating means and vice versa.

16. In an exhibition device, the combination of a row of units, a sight in the outer end of one of the end units of said row, an exhibit-support positioned to be viewed directly through said sight and contained in another unit of said row, a shutter to be interposed between said sight and said exhibit-support, a second row of units lying along the first-mentioned row, an exhibit-support in one of the units of the second-mentioned row, means for reflecting an exhibit on the second-mentioned exhibit-support to said sight, all of said units being separable, illuminating means in the unit of the first-mentioned row which contains the first-mentioned exhibit-support, illuminating means in the unit of the second-mentioned row which contains the second-mentioned exhibit-support, and means for increasing the illumination of one of said illuminating means and simultaneously diminishing the illumination of the other illuminating means and vice versa, and for moving said shutter to effective position when the diminution of the illumination of the first-mentioned illuminating means is completed.

17. In an exhibition device, the combination of a row of units, a sight in the outer end of one of the end units of said row, an exhibit-support positioned to be viewed directly through said sight and contained in another unit of said row, a shutter mounted in a unit in front of the unit containing said exhibit-support and to be interposed between the latter and the sight, a second row of units lying along the first-mentioned row, an exhibit-support in one of the units of the second-mentioned row, means for reflecting an exhibit on the second-mentioned exhibit-support to said sight, all of said units being separable, illuminating means in the unit of the first-mentioned row which contains the first-mentioned exhibit-support, illuminating means in the unit of the second-mentioned row which contains the second-mentioned exhibit-support, and means for increasing the illumination of one of said illuminating means and simultaneously diminishing the illumination of the other illuminating means and vice versa, and for interposing said shutter between the adjacent exhibit-support and the sight when the diminution of the illumination of the first-mentioned illuminating means is completed.

18. In an exhibition device, in combination, a housing provided with a sight to permit exhibits in said housing to be viewed, an exhibit-support positioned to be viewed directly through said sight, a second exhibit-support at one side of the range of vision of said sight, means to reflect the second exhibit-support to said sight, an illuminating means for each of said exhibit-supports, a shutter to be interposed between the first-mentioned exhibit-support and said sight, and means to increase the illumination of one of said illuminating means and to diminish the illumination of the other illuminating means and vice versa, and to cause said shutter to become temporarily effective when the diminution of the illumination of the first-mentioned illuminating means is completed.

19. In an exhibition device, in combination, a housing provided with a sight to permit exhibits in said housing to be viewed, an exhibit-support positioned to be viewed directly through said sight, a second exhibit-support at one side of the range of vision of said sight, means to reflect the second-mentioned exhibit-support to said sight, an illuminating means for each of said exhibit-supports, a shutter to be interposed between the first-mentioned exhibit-support and said sight, said shutter being swingable about an axis so inclined away from a vertical direction that the shutter will normally be held in ineffective position by gravity, and means to increase the illumination of one of said illuminating means and to diminish the illumination of the other illuminating means and vice versa, and to swing said shutter to effective position when the diminution of the illumination of the first-mentioned illuminating means is completed.

20. In an exhibition device, in combination, a housing provided with a sight to permit exhibits in said housing to be viewed, an exhibit-support positioned to be viewed directly through said sight, a second exhibit-support at one side of the range of vision of said sight, means to reflect the second-mentioned exhibit-support to said sight, an illuminating means for each of said exhibit-supports, a shutter to be interposed between the first-mentioned exhibit-support and said sight, means to cause said shutter to be urged to its normal ineffective position, and means to increase the illumination of one of said illuminating means and to diminish the illumination of the other illuminating means and vice versa, and to cause said shutter to be shifted to effective position when the diminution of the illumination of the first-mentioned illuminating means is completed.

21. In an exhibition device, in combination, a housing, two display frames within said housing, means including a sight in the housing to permit said display frames to be viewed from outside the housing, controlling means whereby exhibits to be viewed through said display frames may be illuminated alternately and viewed at said sight, said controlling means comprising means for increasing the illumination at one of said display frames while diminishing the illumination at the other to cause successive views to dissolve from one into the other, and means to change the exhibits at one of said display frames comprising a constantly-rotating exhibit-support positioned to permit an exhibit thereon to be viewed through the corresponding display frame, and a main exhibit-carrier coaxial with and urged to rotate with said constantly-rotating exhibit-support and having means to screen said constantly-rotating exhibit-support except when the main exhibit-carrier is in a display position corresponding to the constantly-rotating exhibit-support, said main exhibit-carrier having thereon other exhibits at intervals to be viewed through the display frame associated with the main exhibit-carrier, when the latter is in corresponding display positions.

22. In an exhibition device, in combination, a housing, two display frames within said housing, means including a sight in the housing to permit said display frames to be viewed from outside the housing, controlling means whereby exhibits to be viewed through said display frames may be illuminated alternately and viewed at said sight, said controlling means comprising means for increasing the illumination at one of said display frames while diminishing the illumination at the other to cause successive views to dissolve from one into the other, means to change the exhibits at one of said display frames comprising a constantly-rotating exhibit-support positioned to permit an exhibit thereon to be viewed through the corresponding display frame, and a main exhibit-carrier coaxial with and urged to rotate with said constantly-rotating exhibit-support and having means to screen said constantly-rotating exhibit-support except when the main exhibit-carrier is in a display position corresponding to the constantly-rotating exhibit-support, said main exhibit-carrier having thereon other exhibits at intervals to be viewed through the display frame associated with the main exhibit-carrier, when the latter is in corresponding display positions, a shutter for one of said display frames, and means whereby said shutter will be actuated to obscure the associated display frame when the diminution of the illumination at the latter has been completed.

23. In an exhibition device, in combination, a housing, two display frames within said housing, means including a sight in the housing to permit said display frames to be viewed from outside the housing, controlling means whereby exhibits to be viewed through said display frames may be illuminated alternately and viewed at said sight, said controlling means comprising means for increasing the illumination at one of said display frames while diminishing the illumination at the other to cause successive views to dissolve from one into the other, and means to change the exhibits at one of said display frames comprising a rotatable exhibit-support positioned to permit an exhibit thereon to be viewed through the corresponding display frame, and a main exhibit-carrier coaxial with said rotatable exhibit-support and enclosing the same and having means to screen said rotatable exhibit-support except when the main exhibit-carrier is in a display position corresponding to the rotatable exhibit-support, said main exhibit-carrier having thereon other exhibits at intervals to be viewed through the display frame associated with the main exhibit-carrier, when the latter is in corresponding display positions.

24. In an exhibition device, in combination, a housing, two display frames within said housing, means including a sight in the housing to permit said display frames to be viewed from outside the housing, controlling means whereby exhibits to be viewed through said display frames may be illuminated alternately and viewed at said sight, said controlling means comprising means for increasing the illumination at one of said display frames while diminishing the illumination at the other to cause successive views to dissolve from one into the other, and means to change the exhibits at one of said display frames comprising a constantly-rotating exhibit-support positioned to permit an exhibit thereon to be viewed through the corresponding display frame, a main exhibit-carrier coaxial with and frictionally urged to rotate with said constantly-rotating exhibit-support and having means to screen said constantly-rotating exhibit-support except when the main exhibit-carrier is in a display position corresponding to the constantly-rotating exhibit-support, said main exhibit-carrier having thereon other exhibits at intervals to be viewed through the display frame associated with the main exhibit-carrier, when the latter is in corresponding display positions, and escapement mechanism for controlling the rotation of said main exhibit-carrier.

25. In an exhibition machine having a sight-tube, means to display alternately through said sight-tube objects at two different fixed display positions, and means to change the objects at one display position, comprising an object-bearing device mounted for movement about a vertical axis and comprising an outer main platform and a secondary platform concentrically within said main platform to be rotated continuously and independently of said main platform, said main platform carrying vertical display walls forming sides of a box, one of the sides of said box being omitted to allow the secondary platform to be viewed, means providing frictional engagement between said main and secondary platforms, so that said platforms shall move together, means for overcoming said frictional engagement to hold said main platform to allow one of said walls or said secondary platform to be viewed, said last-named means comprising lugs on said main platform, one lug for each display position, and a stop normally in engagement with a lug and supported so as to prevent movement of the lug engaged thereby and means for moving said stop out of engaging relation with said lug to allow said main platform to rotate in unison with said secondary platform to the next display position.

26. In an exhibition machine having a sight-tube, means to display alternately through said sight-tube objects at two different fixed display positions, and means to change the objects to be viewed at one of said display positions, comprising an object-bearing device mounted for movement about a vertical axis and comprising an outer main platform and a secondary platform concentrically within said main platform to be rotated continuously and independently of said main platform, said main platform carrying vertical display walls forming sides of a box, one of the sides of the box being omitted to allow the secondary platform to be viewed, means providing frictional engagement between said main and secondary platforms, so that said platforms shall move together, means for overcoming said frictional engagement to hold said main platform to allow one of said walls or said secondary platform to be viewed, said last-named means comprising lugs on said main platform, one lug for each adjustable position, and a stop normally in engagement with a lug and supported so as to prevent movement of the lug engaged thereby, means for moving said stop out of engaging relation with said lug to allow said main platform to rotate in unison with said secondary platform to the next display position, and means for returning said stop immediately after said lug has passed, so as to be in effective position to engage the next lug and hold the main platform in said next display position.

27. In an exhibition machine, a sight, means to display alternately at said sight objects at two different fixed display positions, and means to change the objects to be viewed at one of said display positions, comprising an object-bearing device mounted for movement about a vertical axis and comprising an outer main platform and a secondary platform concentrically within said main platform, means for continuously rotating said secondary platform, said secondary platform comprising an upper plate and a lower plate, said plates forming a groove into which said outer platform fits, the lower of said plate supporting, and having frictional engagement with said outer platform, so that said outer platform shall move in unison with said secondary platform, means for overcoming said frictional engagement to hold said outer platform while the secondary platform rotates, said last-named means comprising lugs on said main platform and a stop normally in engagement with one of said lugs and supported so as to prevent movement of the lug engaged thereby, means for moving said stop out of engaging relation with said lug to allow said main platform to rotate in unison with said secondary platform, and means for returning said stop in time to engage the next lug on the main platform and hold the latter against rotation.

28. In an exhibition machine, a sight, means to display alternately at said sight objects at two different fixed display positions, and means to change the objects to be viewed at one of said display positions, comprising an object-bearing device mounted for movement about a vertical axis and comprising an outer main platform and a secondary platform concentrically within said main platform, means for continuously rotating said secondary platform, said secondary platform comprising an upper plate and a lower plate, said plates forming a groove into which said outer platform fits, the lower of said plates having frictional engagement with said outer platform, so that said outer platform shall move in unison with said secondary platform, means for overcoming said frictional engagement to hold said outer platform while the secondary platform rotates, said last-named means comprising lugs on said main platform and a stop normally in engagement with one of said lugs and supported so as to prevent movement of the lug engaged thereby, means for moving said stop out of engaging relation with said lug to allow said main platform to rotate in unison with said secondary platform, and a counterweight on said stop for returning said stop in time to engage the next lug on the main platform and hold the latter against rotation.

29. In an exhibition machine, a sight, means to display alternately at said sight objects at two different fixed display positions, and means to change the objects to be viewed at one of said display positions, comprising an object-bearing device mounted for movement about a vertical axis and comprising an outer main platform and a secondary platform concentrically within said main platform, means for continuously rotating said secondary platform, said secondary platform comprising an upper plate and a lower plate, said plates forming a groove into which said outer platform fits, one of said plates having frictional engagement with said outer platform, so that said outer platform shall move in unison with said secondary platform, means for overcoming said frictional engagement to hold said outer platform while the secondary platform rotates, said last-named means comprising a lug on said outer platform and a stop normally in engagement with said lug and supported so as to prevent movement of the lug engaged thereby, and means for moving said stop out of engaging relation with said lug to allow said outer platform to rotate in unison with said secondary platform, said last-named means comprising an electromagnet, a shaft, and an armature fixed on one end of said shaft to be attracted by said magnet to rotate said shaft when the magnet is energized, said stop being fixed to the other end of said shaft and rotating therewith.

30. In an exhibition machine, a sight, means to display alternately at said sight objects at two different fixed display positions, and means to change the objects to be viewed at one of said display positions, comprising an object-bearing device mounted for movement about a vertical axis and comprising an outer main platform and a secondary platform concentrically within said main platform, means for continuously rotating said secondary platform, said secondary platform comprising an upper plate and a lower plate, said plates forming a groove into which said outer platform fits, one of said plates having frictional engagement with said outer platform, so that said outer platform shall move in unison with said secondary platform, means for overcoming said frictional engagement to hold said outer platform while the secondary platform rotates, said last-named means comprising a lug on said outer platform and a stop normally in engagement with said lug and supported so as to prevent movement of the lug engaged thereby, means for moving said stop out of engaging relation with said lug to allow said outer platform to rotate in unison with said secondary platform, said last-named means comprising an electro-magnet, a shaft, and an armature fixed on one end of said shaft to be attracted by said magnet to rotate said shaft when the magnet is energized, said stop being fixed to the other end of said shaft and rotating therewith, and means for periodically energizing said magnet.

31. In an exhibition machine, a sight, means to display alternately at said sight objects at two different fixed display positions, and means to change the objects to be viewed at one of said display positions, comprising an object-bearing device mounted for movement about a vertical axis and comprising an outer main platform and a secondary platform concentrically within said main platform, means for continuously rotating said secondary platform, said secondary platform comprising an upper plate and a lower plate, said plates forming a groove into which said outer platform fits, one of said plates having frictional engagement with said outer platform, so that said outer platform shall move in unison with said secondary platform, means for overcoming said frictional engagement to hold said outer platform while the secondary platform rotates, said last-named means comprising a lug on said outer platform and a stop normally in engagement with said lug and supported so as to prevent movement of the lug engaged thereby, means for moving said stop out of engaging relation with said lug to allow said outer platform to rotate in unison with said secondary platform, said last-named means comprising an electromagnet, a shaft, and an armature fixed on one end of said shaft to be attracted by said magnet to rotate said shaft when the magnet is energized, said stop being fixed to the other end of said shaft and rotating therewith, and means for periodically energizing said magnet, said last-named means comprising an electric circuit, a generator in said circuit, a rotating member in the circuit, provided with contacts, and a brush to engage said contacts successively to periodically close the circuit through the magnet and energize said magnet.

32. In an exhibition machine, a sight means to display alternately at said sight objects at two different fixed display positions, and means to change the objects at the display positions, comprising an upper object-bearing device and a lower object-bearing device, each mounted for movement about a vertical axis and each comprising an outer main platform and a secondary platform concentrically within said main platform to be rotated continuously and independently of said main platform, means providing frictional engagement between said main and secondary platforms, so that said platforms shall move together, and means for alternately overcoming the frictional engagement between the main and secondary platforms of the upper and lower object-bearing devices to allow the main platforms of said devices to rotate together with their respective secondary platforms alternately.

33. In an exhibition machine, a sight, means to display alternately at said sight objects at two different fixed display positions, and means to change the objects to be viewed at said display positions, comprising an upper object-bearing device and a lower object-bearing device, each mounted for movement about a vertical axis and each comprising an outer main platform and a secondary platform concentrically within said main platform to be rotated continuously and independently of said main platform, means providing frictional engagement between said main and secondary platforms, so that said platforms shall move together, means for alternately overcoming the frictional engagement between the main and secondary platforms of the upper and lower object-bearing devices to allow the main platforms of said devices to rotate together with their respective secondary platforms alternately, said last-named means comprising lugs on each of said main platforms, and upper and lower stops for engaging the lugs of the respective platforms, said stops being in the path of movement of said lugs and supported so as to prevent movement of lugs engaged thereby, and means for alternately moving the upper and lower stops out of engagement with said lugs to allow the main platforms of the upper and lower devices to rotate together with their secondary platforms alternately.

34. In an exhibition machine, a sight, means to display alternately at said sight objects at two different fixed display positions, and means to change the objects to be viewed at said display positions, comprising an upper object-bearing device and a lower object-bearing device, each mounted for movement about a vertical axis and each comprising an outer main platform and a secondary platform concentrically within said main platform to be rotated continuously and independently of said main platform, means providing frictional engagement between said main and secondary platforms, so that said platforms shall move together, means for alternately overcoming the frictional engagement between the main and secondary platforms of the upper and lower object-bearing devices to allow the main platforms of said devices to rotate together with their respective secondary platforms alternately, said last-named means comprising lugs on each of said main platforms, and upper and lower stops for engaging the lugs of the respective platforms, said stops being in the path of movement of said lugs and supported so as to prevent movement of lugs in engagement therewith, means for alternately moving the upper and lower stops out of engagement with said lugs to allow the main platforms of the upper and lower devices to rotate together with their secondary platforms alternately, said last-named means comprising an electromagnet for each of said stops, each of said magnets forming part of an electric circuit, a generator for energizing each of said magnets, and a device in said circuits for alternately closing the circuits through said magnets to alternately move said upper and lower stops.

35. In an exhibition machine, a sight, means to display alternately at said sight objects at two different fixed display positions, and means to change the objects to be viewed at said display positions, comprising an upper object-bearing device and a lower object-bearing device, each mounted for movement about a vertical axis and each comprising an outer main platform and a secondary platform concentrically within said main platform to be rotated continuously and independently of said main platform, means providing frictional engagement between said main and secondary platforms, so that said platforms shall move together, means for alternately overcoming the frictional engagement between the main and secondary platforms of the upper and lower object-bearing devices to allow the main platforms of said devices to rotate together with their respective secondary platforms alternately, said last-named means comprising lugs on each of said main platforms and upper and lower stops for engaging the lugs of the respective platforms, said stops being in the path of movement of said lugs and supported so as to prevent movement of lugs in engagement therewith, and means for alternately moving the upper and lower stops out of engagement with said lugs to allow the main platforms of the upper and lower devices to rotate together with their secondary platforms alternately, said last-named means comprising an electromagnet for each of said stops, each of said magnets forming part of an electric circuit, a generator for energizing each of said magnets, a device in said circuits for alternately closing the circuits through said magnets to alternately move said upper and lower stops, said circuit-closing device comprising a rotatable member carrying contact-rings having spaced prongs, alternate prongs being on the same ring and consequently in the same circuit, and a brush contacting alternately with prongs of each circuit to close the respective circuit.

36. In an exhibition machine, a sight, means whereby objects at two different fixed display positions may be illuminated and displayed alternately at said sight and means to change the objects at said display positions, comprising an upper object-bearing device and a lower object-bearing device, each mounted for movement about a vertical axis and each comprising an outer main platform and a secondary platform centrically within said main platform to be rotated continuously and independently of said main platform, means providing frictional engagement between said main and secondary platforms, to urge said platforms to move together, means for alternately overcoming the frictional engagement between the main and secondary platforms of the upper and lower object-bearing devices to allow the main platforms of said devices to rotate together with their respective secondary platforms alternately, said last-named means comprising lugs on each of said main platforms and upper and lower stops for engaging the lugs of the respective platforms, said stops being in the path of movement of said lugs, and so supported as to prevent movement of lugs engaged thereby, means for alternately moving the upper and lower stops out of engagement with said lugs to allow the main platforms of the upper and lower devices to rotate together with their secondary platforms alternately, said last-named means comprising an electromagnet for each of said stops, each of said magnets forming part of an electric circuit, a generator for energizing each of said magnets, a device in said circuits for alternately closing the circuits through said magnets to alternately move said upper and lower stops, said circuit-closing device comprising a rotatable member carrying contact-rings having spaced prongs, alternate prongs being on the same ring and consequently in the same circuit, and a brush contacting alternately with prongs of each circuit to close the respective circuit, and means for rotating said rotatable member at a constant speed to close said circuits alternately at regular intervals.

37. In an exhibition machine, a sight through which objects at two different fixed display positions may be viewed, means whereby objects at said display positions will be illuminated alternately at said sight, and means, to change the objects at said display positions, comprising an upper object-bearing device and a lower object-bearing device, each mounted for movement about a vertical axis and each comprising an outer main platform and a secondary platform concentrically within said main platform to be rotated continuously and independently of said main platform, means providing frictional engagement between said main and secondary platforms, so that said platforms shall move together, means for alternately overcoming the frictional engagement between the main and secondary platforms of the upper and lower object-bearing devices to allow the main platforms of said devices to rotate together with their respective secondary platforms alternately, said last-named means comprising lugs on each of said main platforms and upper and lower stops for engaging the lugs of the respective platforms, said stops being in the path of movement of said lugs and so supported as to prevent movement of lugs engaged thereby, means for alternately moving the upper and lower stops out of engagement with said lugs to allow the main platforms of the upper and lower devices to rotate together with their secondary platforms alternately, said last-named means comprising an electromagnet for each of said stops, each of said magnets forming part of an electric circuit, a generator for energizing each of said magnets, a device in said circuits for alternately closing the circuits through said magnets to alternately move said upper and lower stops, said circuit-closing device comprising a rotary member carrying contact-rings having spaced prongs, alternate prongs being on the same ring and consequently in the same circuit, a brush contacting alternately with prongs of each circuit to close the respective circuit, and means for rotating said rotary member at a constant speed to close said circuits alternately at regular intervals, said generator being operated by said rotary-member rotating means.

38. In an exhibition device, the combination of an upper platform and a lower platform, a set of electrical illuminating means for each platform, a selector mechanism in the circuit of both sets for increasing the illumination of one set while decreasing the illumination of the other set, said selector mechanism comprising coils fixed to the frame of the device, and a rotary shaft mounted in a fixed support and carrying a contact-ring for each circuit, each contact-ring being provided with rods to sweep over said coils to include more or less resistance in their respective circuits to dim or brighten the illuminating means in said circuits, the rods being so positioned that those on one contact-ring are increasing the amount of resistance in their circuit while the rods on the other contact-ring are decreasing the amount of resistance in their circuit.

39. In an exhibition device, the combination of an upper platform and a lower platform, a set of electrical illuminating means for each platform, both sets of illuminating means being fed from the same source, a selector mechanism in the circuit of both sets for increasing the illumination of one set while decreasing the illumination of the other set, said selector mechanism comprising coils fixed to the frame of the device, and a rotary shaft mounted in a fixed support and carrying a contact-ring for each circuit, each contact-ring being provided with rods to sweep over said coils to include more or less resistance in their respective circuits to dim or brighten the illuminating means in said circuit, the rods being so positioned that those on one contact-ring are increasing the amount of resistance in their circuit while the rods on the other contact-ring are decreasing the amount of resistance in their circuit.

40. In an exhibition device, the combination of an upper platform and a lower platform, a set of electrical illuminating means for each platform, both sets of illuminating means being fed from the same source, a selector mechanism in the circuit of both sets for increasing the illumination of one set while decreasing the illumination of the other set, said selector mechanism comprising coils fixed to the frame of the device, and a rotary shaft mounted in a fixed support and carrying a contact-ring for each circuit, each contact-ring being provided with rods to sweep over said coils to include more or less resistance in their respective circuits to dim or brighten the illuminating means in said circuits, the rods being so positioned that those on one contact-ring are increasing the amount of resistance in their circuit while the rods on the other contact-ring are decreasing the amount of resistance in their circuit, said rods leaving said coils, after the maximum resistance has been included in a circuit, to break said circuit and extinguish the illuminating means therein, said rods also leaving said coils after the minimum resistance has been included, but without breaking the circuit, so that all the current passes through said last-named circuit to give full illumination to the illuminating means therein.

41. In an exhibition device, the combination of an upper platform and a lower platform, a set of electrical illuminating means for each platform, both sets of illuminating means being fed from the same source, a selector mechanism in the circuit of both sets for increasing the illumination of one set while decreasing the illumination of the other set, said selector mechanism comprising coils fixed to the frame of the device, a rotary shaft mounted in a fixed support and carrying a contact-ring for each circuit, said contact-rings being mounted on the shaft for rotation therewith but freely movable laterally therealong, each contact-ring being provided with rods to sweep over said coils to include more or less resistance in their respective circuits, the rods being so positioned that those on one contact-ring are increasing the amount of resistance in their circuit while the rods on the other contact-ring are decreasing the amount of resistance in their circuit, and springs fixed to said shaft and urging each of said contact-rings in a direction for forcing the rods thereon into close contact with said coils.

42. In an exhibition device, the combination of an upper platform and a lower platform, a set of electrical illuminating means for each platform, both sets of illuminating means being fed from the same source, a selector mechanism in the circuit of both sets for increasing the illumination of one set while decreasing the illumination of the other set, said selector mechanism comprising coils fixed to the frame of the device, a rotary shaft mounted in a fixed support and carrying a contact-ring for each circuit, said contact-rings being mounted on the shaft for rotation therewith but freely movable laterally therealong, each contact-ring being provided with rods to sweep over said coils to include more or less resistance in their respective circuits, the rods being so positioned that those on one contact-ring are increasing the amount of resistance in their circuit while the rods on the other contact-ring are decreasing the amount of resistance in their circuit, said coils being positioned between said contact-rings so that the rods on the two contact-rings contact with opposite sides of said coils, and springs fixed to said shaft and pressing said contact-rings for forcing the rods thereon into close contact with said coils.

43. In an exhibition device, the combination of an upper platform and a lower platform, a set of electrical illuminating means for each platform, both sets of illuminating means being fed from the same source, a selector mechanism in the circuit of both sets for increasing the illumination of one set while decreasing the illumination of the other set, said selector mechanism comprising coils fixed to the frame of the device, a rotary shaft mounted in a fixed support and carrying a contact-ring for each circuit, said contact-rings being mounted on the shaft for rotation therewith but freely movable therealong, each contact-ring being provided with rods to sweep over said coils to include more or less resistance in their respective circuits, the rods on one contact-ring being spaced in alternating relation with the rods on the other contact-ring, so that the rods on one contact-ring are increasing the amount of resistance in their circuit while the rods on the other contact-ring are decreasing the amount of resistance in their circuit, and springs fixed to said shaft and pressing said contact-rings for forcing said rods into close contact with said coils.

44. In an exhibition device, the combination of an upper platform and a lower platform, a set of electrical illuminating means for each platform, both sets of illuminating means being fed from the same source, a selector mechanism in the circuit of both sets for increasing the illumination of one set while decreasing the illumination of the other set, said selector mechanism comprising coils fixed to the frame of the device, a rotary shaft mounted in a fixed support and carrying a contact-ring for each circuit, said contact-rings being mounted on the shaft for rotation therewith but freely movable therealong, each contact-ring being provided with rods to sweep over said coils to include more or less resistance in their respective circuits, the rods on one contact-ring being spaced in alternating relation with the rods on the other contact-ring, so that the rods on one contact-ring are increasing the amount of resistance in their circuit while the rods on the other contact-ring are decreasing the amount of resistance in their circuit, springs fixed to said shaft and pressing said contact-rings for forcing said rods into close contact with said coils, and means for rotating said shaft and contact-rings at a constant speed to alternately increase and decrease the amount of resistance in the two circuits to illuminate and darken each platform alternately at regular intervals.

45. In an exhibition device, the combination of an upper platform and a lower platform, means for normally rotating said platforms, means for holding said platforms against rotation, electromagnetic releasing means for each of said holding means to allow the platforms to rotate, a shunt-generator for supply energy to said magnets, a circuit-closing device for periodically permitting said magnets to be energized to release said platforms, said circuit-closing device comprising a rotary member having prongs, alternate prongs being in the circuit of the same electromagnet, a brush contacting with said prongs to alternately close the circuits through the magnets of the upper and lower platforms, said rotary member being mounted upon a shaft, means for rotating said shaft at a constant speed to secure equal time intervals between energizing of said magnets and rotation of said platforms, and means for illuminating said platforms alternately and at such times that each platform will be at rest when illuminated, said illuminating means comprising means for increasing the illumination of one platform while the illumination of the other is being diminished.

46. In an exhibition device, the combination of an upper platform and a lower platform, means for normally rotating said platforms, means for holding said platforms against rotation, electromagnetic releasing means for each of said holding means to allow the platforms to rotate, a shunt-generator for supplying energy to said magnets, a circuit-closing device for periodically permitting said magnets to be energized to release said platforms, said circuit-closing device comprising contact-rings having their prongs alternating, alternate prongs being in the circuit of the same electromagnet, a brush contacting with said prongs to alternately close the circuits through the magnets of the upper and lower platforms, said circuit-closing device being mounted upon a shaft, means for rotating said shaft at a constant speed to secure equal time intervals between energizing of said magnets and rotation of said platforms, said shaft-rotating means comprising a series-motor driving said shaft, said motor also driving said shunt-generator which has a definite maximum capacity which limits and renders constant the speed of the series-motor, and means for illuminating said platforms alternately and at such times that each platform will be at rest when illuminated, and for increasing the illumination of one platform while the illumination of the other is decreasing.

47. In an exhibition device, the combination of an upper platform and a lower platform, means for normally rotating said platforms, means for holding said platforms against rotation, electromagnetic releasing means for each of said holding means to allow the platforms to rotate, a shunt-generator for supplying energy to said magnets, a circuit-closing device for periodically permitting said magnets to be energized, said circuit-closing device comprising contact-rings having prongs, alternate prongs being in the circuit of the same electromagnet, and a brush contacting with said prongs, said contact-rings being mounted upon a shaft, a set of electrical illuminating means for each platform, a selector mechanism in the circuit of both sets for increasing the illumination of one set while decreasing the illumination of the other set, said selector mechanism comprising coils fixed to the frame of the device, contact-rings on said shaft, one in each circuit, rods on each of said last-named contact-rings to sweep over said coils to include more or less resistance in their respective circuits, the rods being so positioned that those on one contact-ring are increasing the amount of resistance in their circuit while the rods on the other contact-ring are decreasing the amount of resistance in their circuit, and means for rotating said shaft at a constant speed to secure equal time intervals between rotation of the platforms and the lighting and dimming of said platforms, said shaft-rotating means comprising a series-motor driving said shaft and said motor also driving said shunt-generator which has a definite maximum capacity which limits and renders constant the speed of the series-motor.

48. In an exhibition device, the combination of an upper platform and a lower platform, means for normally rotating said platforms, means for holding said platforms against rotation, electromagnetic releasing means for each of said holding means to allow the platforms to rotate, a shunt-generator for supplying energy to said magnets, a circuit-closing device for periodically permitting said magnets to be energized, said circuit-closing device comprising contact-rings having prongs, alternate prongs being in the circuit of the same electromagnet, and a brush contacting with said prongs, said contact-rings being mounted upon a shaft, a set of electrical illuminating means for each platform, a selector mechanism in the circuit of both sets for increasing the illumination of one set while decreasing the illumination of the other set, said selector mechanism comprising coils fixed to the frame of the device, contact-rings on said shaft, one in each circuit, rods on each of said last-named contact-rings to sweep over said coils to include more or less resistance in their respective circuits, the rods being so positioned that those on one contact-ring are increasing the amount of resistance in their circuit while the rods on the other contact-ring are decreasing the amount of resistance in their circuit, and means for rotating said shaft at a constant speed to secure equal time intervals between rotation of the platforms and the lighting and dimming of said platforms, said circuit-closing device and said selector mechanism being so positioned relatively to one another that the circuit through an electromagnet is energized to release a platform when the respective platform is darkened.

49. In an exhibition device having a sight-tube, the combination of an upper platform and a lower platform, means for alternately lighting one platform while dimming the other, one of said platforms being positioned to be viewed directly through said sight-tube, the other platform being positioned to permit it to be reflected to said sight-tube, means to reflect the last-mentioned platform to the sight-tube, a shutter in front of the platform to be viewed directly and normally ineffective, and means for rendering said shutter effective when said platform is darkened to prevent reflected light from rendering said darkened platform visible.

50. In an exhibition device having a sight-tube, the combination of an upper platform and a lower platform, means for alternately lighting one platform while dimming the other, one of said platforms being positioned to be viewed directly through said sight-tube, the other platform being positioned to permit it to be reflected to said sight-tube, means to reflect the last-mentioned platform to the sight-tube, means for rotating said platforms alternately, said rotation taking place when the respective platform is darkened, a shutter in front of the platform to be viewed directly and normally ineffective, and means for rendering said shutter effective when said platform is darkened to prevent reflected light from rendering said darkened platform visible during the rotation thereof.

51. In an exhibition device having a sight-tube, the combination of an upper platform and a lower platform, means for alternately lighting one platform while dimming the other, one of said platforms being positioned to be viewed directly through said sight-tube, the other platform being positioned to permit it to be reflected to said sight-tube, means to reflect the last-mentioned platform to the sight-tube, means for rotating said platforms alternately, said rotation taking place when the respective platform is darkened, a shutter in front of the platform to be viewed directly and normally ineffective, and means for rendering said shutter effective when said platform is darkened to prevent reflected light from rendering said darkened platform visible during the rotation thereof, said shutter being held effective by said last-mentioned means until the rotation of said platform has ceased, when it is rendered ineffective.

52. In an exhibition device having a sight-tube, the combination of an upper platform and a lower platform, one of said platforms being positioned to be viewed directly through said sight-tube, the other platform being positioned to permit it to be reflected to said sight-tube, means to reflect the last-mentioned platform to the sight-tube, a shutter in front of the platform to be viewed directly, said shutter being normally ineffective, means including a motor to drive said shutter to effective position, a set of electrical illuminating means for each platform, selector means for alternately lighting one platform and dimming the other, said selector means comprising resistance coils, a rotating shaft, contact-rings on said shaft, one in each illuminating circuit, and rods on said contact-rings to sweep over said coils to include more or less resistance in their respective circuits, and a brush adjacent said coils for contacting with a rod of the illuminating circuit of the platform which is viewed directly to close the circuit through the motor, the contact taking place substantially at the time when said rod has included nearly all of the resistance and the directly viewed platform is substantially dark.

53. In an exhibition device having a sight-tube, the combination of an upper platform and a lower platform, one of said platforms being positioned to be viewed directly through said sight-tube, the other platform being positioned to permit it to be reflected to said sight-tube, means to reflect the last-mentioned platform to the sight tube, a shutter in front of the platform to be viewed directly, said shutter being normally ineffective, means including a motor to drive said shutter to effective position, a set of electrical illuminating means for each platform, selector means for alternately lighting one platform and dimming the other, said selector means comprising resistance coils, a rotating shaft, contact-rings on said shaft, one in each illuminating circuit, and rods on said contact-rings for sweeping over said coils to include more or less resistance in their respective circuits, the rods being so positioned that those on one contact-ring are increasing the amount of resistance in their circuit while the rods on the other contact-ring are decreasing the amount of resistance in their circuit, said rods leaving said coils, after the maximum resistance has been included in a circuit, to break said circuit and extinguish the illuminating means therein, and a brush adjacent said coils for contacting with a rod of the illuminating circuit of the platform which is viewed directly to close the circuit through the motor, the contact taking place substantially at the time when said rod has included nearly all of the resistance of one of said coils and the directly viewed platform is substantially dark, the current passing through said motor at the time of contact being insufficient to operate said shutter, the current passing through said motor when said rod has left the coil to break the circuit of the illuminating means of the directly viewed platform being sufficient to operate said shutter.

54. In an exhibition device having a sight-tube, the combination of an upper platform and a lower platform, one of said platforms being positioned to be viewed directly through said sight-tube, the other platform being positioned to permit it to be reflected to said sight-tube, means to reflect the last-mentioned platform to the sight-tube, a shutter in front of the platform to be viewed directly, said shutter being normally ineffective, means including a motor to drive said shutter to effective position, a set of electrical illuminating means for each platform, selector means for alternately lighting one platform and dimming the other, said selector means comprising resistance coils, a rotating shaft, contact-rings on said shaft, one in each illuminating circuit, and rods on said contact-rings for sweeping over said coils to include more or less resistance in their respective circuits, the rods being so positioned that those on one contact-ring are increasing the amount of resistance in their circuit while the rods on the other contact-ring are decreasing the amount of resistance in their circuit, said rods leaving said coils, after the maximum resistance has been included in a circuit, to break said circuit and extinguish the illuminating means therein, a brush adjacent said coils for contacting with a rod of the illuminating circuit of the platform which is viewed directly to close the circuit through the motor, the contact taking place substantially at the time when said rod has included nearly all of the resistance of one of said coils and the directly viewed platform is substantially dark, the current passing through said motor at the time of contact being insufficient to operate said shutter, the current passing through said motor when said rod has left the coil to break the circuit of the illuminating means of the directly viewed platform being sufficient to operate said shutter, and means for rotating said platforms to a new position when said platforms are darkened, said brush contacting with said rod until the directly viewed platform has rotated to the new position, whereupon the circuit through the motor is broken by the rod passing off the brush, and the shutter is rendered ineffective.

55. In an exhibition device having a sight-tube, the combination of an upper platform and a lower platform, means for alternately lighting one platform while darkening the other, one of said platforms being positioned to be viewed directly through said sight-tube, the other platform being positioned to permit it to be reflected to said sight-tube, means to reflect the last-mentioned platform to the sight-tube, a shutter in front of the directly-viewed platform, and means, normally ineffective, for rendering said shutter effective when said platform is darkened to prevent reflected light from rendering said darkened platform visible.

56. In an exhibition device having a sight-tube, the combination of an upper platform and a lower platform, means for alternately lighting one platform while darkening the other, one of said platforms being positioned to be viewed directly through said sight-tube, the other platform being positioned to permit it to be reflected to said sight-tube, means to reflect the last-mentioned platform to said sight-tube, a shutter in front of the directly-viewed platform, and means, normally ineffective, for rendering said shutter effective when said platform is darkened to prevent reflected light from rendering said darkened platform visible, said shutter being so mounted as to fall by gravity to ineffective position when said last-named means ceases to operate.

57. In an exhibition device, a plurality of exhibit-carriers, means to illuminate said carriers one at a time, obscuring means for one of said carriers, comprising a shutter normally urged to ineffective position, and means operatively connected to said illuminating means for shifting said shutter to effective position when the illumination of the corresponding carrier is destroyed.

58. In an exhibition device, a plurality of exhibit-carriers, means to illuminate said carriers one at a time, obscuring means for one of said carriers, comprising a shutter normally urged to ineffective position, and means for shifting said shutter to effective position when the illumination of the corresponding carrier is destroyed, said shifting means comprising an electric fan controlled by said illuminating means to be thrown into operation when the illumination is so destroyed.

59. In an exhibition device, a sight, a rotatable exhibit to be viewed through said sight, a carrier, rotatable about the same axis, having thereon a plurality of exhibits arranged around the first exhibit at uniform intervals, and having a gap to display the first exhibit, means to rotate said rotatable exhibit continuously, and means connected with said rotating means, to rotate said carrier intermittently to display the exhibits thereon one by one at said sight, and to display said rotatable exhibit when the gap in the exhibits on the carrier is opposite the sight.

60. In an exhibition-device, a unit provided with a sight, two units having exhibit-supports therein, and two units each having a reflector, one of the exhibit-support-containing units being displaced out of the line of sight, each unit with its exhibits in upright position, and the units containing the reflectors so positioned as to enable the reflectors to cooperate to afford through the sight a view of either of said exhibit-supports.

61. In an exhibition device having a sight, the combination of two exhibits, the first positioned in the line of sight through said sight, and the second at one side of said line of sight, means to reflect the second exhibit to the sight, means for alternately lighting said exhibits, a normally ineffective shutter for the directly-viewed exhibit, and means connected to said lighting means for rendering said shutter effective when the corresponding exhibit is darkened.

62. In an exhibition device having two different exhibit positions, separate sets of electric illuminating means for said exhibit positions, and controlling means for increasing the illumination of one set while decreasing the illumination of the other set, and for maintaining one set at full illumination for a predetermined interval after the other is completely darkened, said controlling means comprising coils connected by a conductor, of suitable length, connected with the control circuit, and contacts for said sets alternately traveling along said coils and said conductor, so that each of such contacts, as its travels, increases the illumination of one set, maintains it constant for a predetermined interval, and then diminishes the illumination.

63. In an exhibition device having two different exhibits, a set of electric lighting means for each exhibit, and controlling means for alternately increasing the illumination of one set while decreasing the illumination of the other set, said controlling means comprising two resistance coils connected at their adjacent ends to a conductor connected with the lighting circuit, a shaft, a rotary contact-member for each set, mounted on said shaft, on opposite sides of said coils, for rotation with the shaft, but freely movable therealong, and having alternately arranged contacts to wipe over said coils, and means for yieldably pressing said contact-members towards said coils.

64. In an exhibition device having a sight, the combination of two rotatable floors forming exhibit-supports to be alternately displayed, one floor being positioned for an exhibit thereon to be viewed directly through said sight, and the second floor being positioned with an exhibit out of the line of sight, and means for reflecting an exhibit on the second floor in natural position through said sight.

65. In an exhibition device having a sight, an exhibit-support rotatably mounted, a second exhibit-support rotatable about the same axis as the first, plane exhibit members arranged on the second support around the exhibit on the first support, to form in cross-section a regular polygon with one side omitted, the gap thus formed permitting, when brought to the line of sight, a view of the first support, means for rotating the first support, and means for rotating the second support intermittently to bring the exhibits thereon one by one to the line of sight.

66. In an exhibition device having a sight, an exhibit floor in the line of sight, a second exhibit floor out of said line of sight, means including an inclined transparent plate extending between said sight and the first exhibit to reflect the second exhibit to the sight and also including a second inclined plate, exhibiting the articles on the second floor in natural position, means for alternately illuminating the exhibits to determine the one to be viewed through the sight, and a shutter device between said transparent plate and the first exhibit and preventing a view thereof when the second exhibit is illuminated for reflection through the sight.

67. In an exhibition device having a sight, an exhibit in the line of sight, a second exhibit out of said line of sight, means including an inclined transparent plate extending between said sight and the first exhibit to reflect the second exhibit to the sight, means for alternately illuminating the exhibits to determine the one to be viewed through the sight, a shutter between said plate and the first exhibit to prevent a view thereof when the second exhibit is illuminated for reflection through the sight, and means controlled by the illuminating means for rendering said shutter effective when the first exhibit is darkened and the second exhibit is illuminated.

68. In an exhibition-device, the combination of a row of units, a front sight in one of said units, and an object-bearing floor positioned to be viewed directly through said sight in another of said units, a second row of units including a second object-bearing floor, and co-operative means partly in said first row and partly in said second row, for reflecting said second floor to said sight; said rows being viewable simultaneously.

69. In an exhibition-device comprising a sight, the combination of two object-bearing floors alternately displayable, and each capable of supporting removable objects in natural position thereon, the objects on one of said floors viewable directly through said sight, an angular reflector-plate for the other floor, and a second angular plate reflecting the objects from the first reflector-plate in natural position through said sight; said floors being viewable simultaneously.

70. In an exhibition-device comprising a sight, the combination of two object-bearing floors alternately displayable, and each capable of supporting removable objects in natural position thereon, the objects on one of said floors viewable directly through said sight, an angular reflector-plate for the other floor, and a second angular plate reflecting the objects from the first reflector-plate in natural position through said sight, one of said floors being above the other.

71. In an exhibition-device comprising a sight, the combination of two object-bearing floors alternately displayable, and each capable of supporting removable objects in natural position thereon, the objects on one of said floors viewable directly through said sight, an angular reflector-plate for the other floor, a second angular plate reflecting the objects from the first reflector-plate in natural position through said sight, and means connected to said floors for revolving them concomitantly.

72. In an exhibition-device comprising a sight, the combination of two object-bearing floors alternately displayable, and each capable of supporting removable objects in natural position thereon, the objects on one of said floors viewable directly through said sight, an angular reflector-plate for the other floor, a second angular plate reflecting the objects from the first reflector-plate in natural position through said sight, means connected to said floors for revolving them concomitantly, and automatic means for lighting and darkening said floors in proper sequence.

ALFRED E. OSWALD.